(12) United States Patent
Norman et al.

(10) Patent No.: US 9,773,067 B2
(45) Date of Patent: Sep. 26, 2017

(54) PERSONAL INTELLIGENCE PLATFORM

(71) Applicant: Microsoft Technology Licensing, LLC, Redmond, WA (US)

(72) Inventors: Morgan S. Norman, San Francisco, CA (US); Fred J. Studer, Mercer Island, WA (US); Radu Ranga, San Francisco, CA (US); John-Paul McGreevy Walti, San Mateo, CA (US); Gen Williams, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 21 days.

(21) Appl. No.: 14/509,607

(22) Filed: Oct. 8, 2014

(65) Prior Publication Data

US 2015/0347595 A1    Dec. 3, 2015

Related U.S. Application Data

(60) Provisional application No. 62/005,567, filed on May 30, 2014.

(51) Int. Cl.
| | | |
|---|---|---|
| *G06F 21/62* | (2013.01) | |
| *H04L 29/06* | (2006.01) | |
| *G06F 17/30* | (2006.01) | |
| *G06Q 30/02* | (2012.01) | |

(52) U.S. Cl.
CPC .... *G06F 17/30867* (2013.01); *G06F 21/6245* (2013.01); *G06Q 30/02* (2013.01); *H04L 63/102* (2013.01); *H04L 63/107* (2013.01)

(58) Field of Classification Search
CPC .. G06F 21/6245; H04L 63/102; H04L 63/107
See application file for complete search history.

(56) References Cited

U.S. PATENT DOCUMENTS

| | | | | |
|---|---|---|---|---|
| 5,920,848 | A * | 7/1999 | Schutzer | G06Q 20/10 705/33 |
| 8,694,577 | B2 | 4/2014 | D'Angelo et al. | |
| 2002/0143961 | A1* | 10/2002 | Siegel | G06F 21/6245 709/229 |
| 2006/0256959 | A1* | 11/2006 | Hymes | H04M 1/26 379/433.04 |
| 2008/0059474 | A1* | 3/2008 | Lim | G06F 17/3089 |
| 2009/0070412 | A1* | 3/2009 | D'Angelo | G06Q 10/10 709/203 |
| 2011/0026704 | A1* | 2/2011 | Connelly | H04L 63/102 379/219 |

(Continued)

OTHER PUBLICATIONS

Bruns, et al., "Distributed Profiling in a Partitioned Ambient Network", In Proceedings of 6th International Conference on Mobile and Ubiquitous Multimedia, Dec. 12, 2007, pp. 34-41.

(Continued)

*Primary Examiner* — Jason C Chiang
(74) *Attorney, Agent, or Firm* — Christopher J. Volkmann; Kelly, Holt & Christenson, PLLC

(57) ABSTRACT

A personal intelligence platform uses a personal intelligence profile. A user can configure his or her mobile device to generate a signal containing portions of his or her personal information profile to obtain responses based upon the signal generated.

14 Claims, 25 Drawing Sheets

(56) References Cited

U.S. PATENT DOCUMENTS

| | | | |
|---|---|---|---|
| 2011/0184643 A1* | 7/2011 | Abhyanker | G06F 17/3087 |
| | | | 701/533 |
| 2011/0238482 A1* | 9/2011 | Carney | G06F 17/30867 |
| | | | 705/14.36 |
| 2012/0158792 A1* | 6/2012 | MacLaurin | G06F 17/30867 |
| | | | 707/802 |
| 2012/0316962 A1* | 12/2012 | Rathod | G06F 17/30861 |
| | | | 705/14.54 |
| 2013/0030919 A1* | 1/2013 | Brinson, Jr. | G06Q 30/0251 |
| | | | 705/14.58 |
| 2013/0080911 A1* | 3/2013 | Klemm | G06F 17/3089 |
| | | | 715/745 |
| 2013/0144708 A1* | 6/2013 | Williams | G06Q 30/02 |
| | | | 705/14.39 |
| 2013/0179268 A1 | 7/2013 | Hu et al. | |
| 2013/0212028 A1 | 8/2013 | Delhaes | |
| 2014/0108527 A1* | 4/2014 | Aravanis | G06Q 50/01 |
| | | | 709/204 |

OTHER PUBLICATIONS

"Systemize Personalization with Microsoft Dynamics CRM and SharePoint", Published on: Dec. 13, 2013, Available at: http://community.dynamics.com/crm/b/crmsoftwareblog/archive/2013/12/13/systemize-personalization-with-microsoft-dynamics-crm-and-sharepoint.aspx.

Zaifullah, Mohammad, "Information Sharing based on a Self-controlled Personal Data Store", In Master's Thesis in Informatik, Aug. 12, 2013, 90 pages.

International Search Report and Written Opinion for International Application No. PCT/US2015/032775, date of mailing: Aug. 6, 2015, date of filing: May 28, 2015, 10 pages.

Second Written Opinion for International Patent Application No. PCT/US2015/032775, date of mailing: May 17, 2016, date of filing: May 28, 2015, 6 pages.

International Preliminary Report on Patentability for International Patent Application No. PCT/US2015/032775, date of mailing: Sep. 13, 2016, date of filing: May 28, 2015, 7 pages.

* cited by examiner

PERSONAL INTELLIGENCE PLATFORM

CROSS-REFERENCE TO RELATED APPLICATION

The present application is based on and claims the benefit of U.S. provisional patent application Ser. No. 62/005,567, filed May 30, 2014, the content of which is hereby incorporated by reference in its entirety.

BACKGROUND

Computing systems are currently in wide use. Many computing systems are deployed on mobile devices that users often use to perform a wide variety of tasks.

The mobile devices, themselves, can have functionality to perform computation and analysis, and can also have various sensors that sense a wide variety of things (such as location, orientation, a variety of different types of user inputs including voice, touch, keypad or virtual keypad inputs, etc.). In addition, mobile devices can communicate with remote devices using a wide variety of different types of communication. For instance, mobile devices can communicate using wired or wireless near field communication systems, using the cellular network, using WIFI and other types of Internet-accessing systems, using satellite communication systems, among a wide variety of others.

The discussion above is merely provided for general background information and is not intended to be used as an aid in determining the scope of the claimed subject matter.

SUMMARY

A personal intelligence platform uses a personal intelligence profile. A user can configure his or her mobile device to generate a signal containing portions of his or her personal information profile to obtain responses based upon the signal generated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
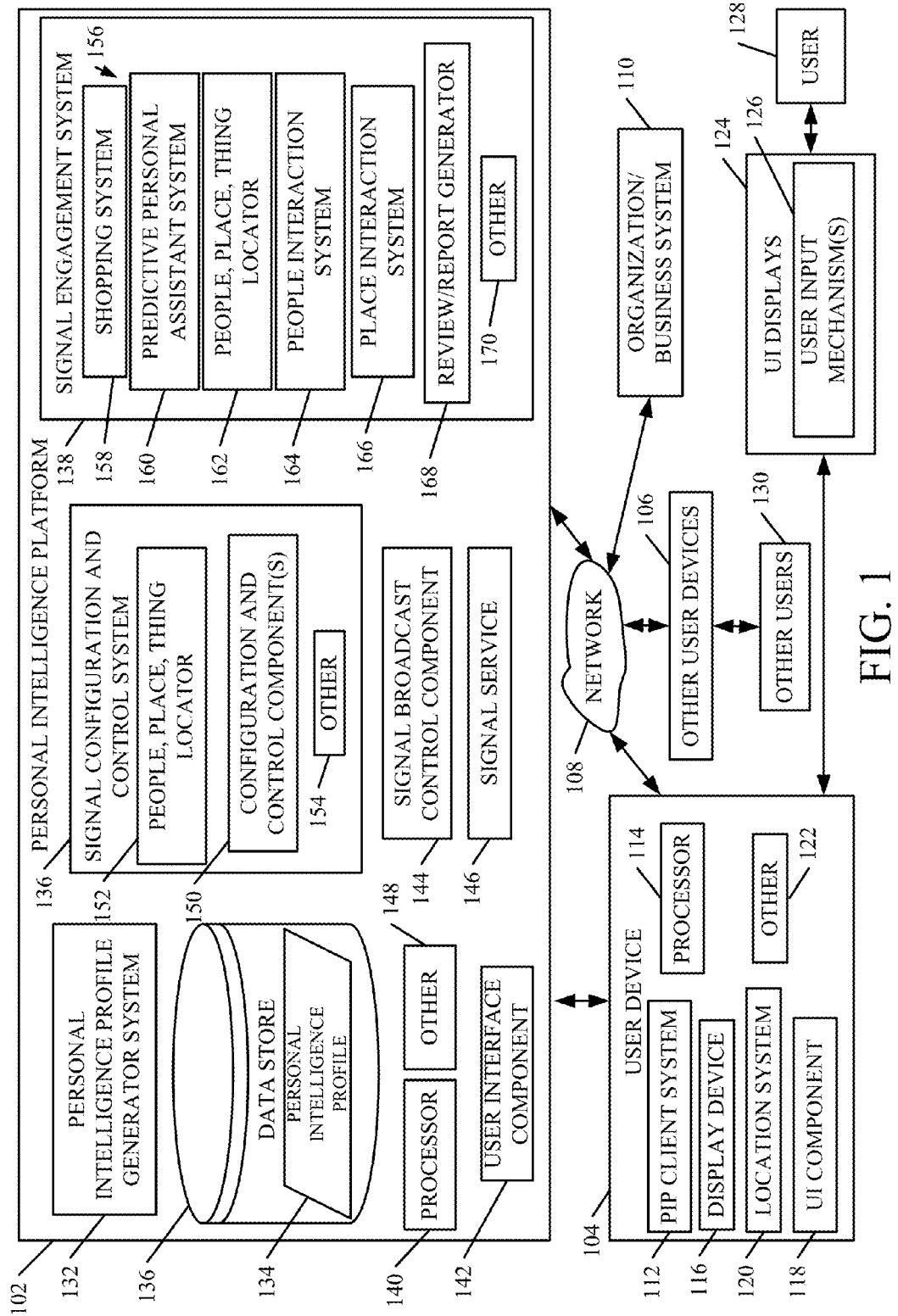
FIG. 1 is a block diagram of one example of a personal intelligence platform architecture.

FIG. 1 shows one example of a block diagram of a personal intelligence platform architecture 100. Architecture 100 illustratively includes personal intelligence platform 102 that is shown connected to a plurality of user devices 104-106 over a network 108. Platform 102 is also shown connected to a plurality of organization or business systems 110. Each user device 104-106 can have a personal intelligence platform client system 112, a processor 114, a display device 116, a user interface component 118, a location system 120, and it can include a wide variety of other items 122 as well.

In one embodiment, user interface component 118, either by itself or under the control of another item on user device 104, illustratively generates user interface displays 124 with user input mechanisms 126 for interaction by user 128. It can also generate other user interface outputs with user input mechanisms 126 that are not visual. For instance, it can generate and receive audio and haptic outputs and inputs.

User 128 illustratively interacts with user input mechanisms 126 in order to control and manipulate user device 104, and also in order to control and manipulate certain portions of personal intelligence platform 102. Other users 130 can illustratively perform the same operations using other devices 106. Employees or workers at other organizations and business systems 110 can also illustratively use devices to take advantage of certain aspects of personal intelligence platform 102.

In the embodiment shown in FIG. 1, personal intelligence platform 102 illustratively includes a personal intelligence profile generator system 132. It can be used to automatically and/or manually generate and store personal intelligence profiles 134 for one or more users 128-130. Profiles 134 can be stored in data store 136, or elsewhere, for later use.

Personal intelligence platform 102 also illustratively includes signal configuration and control system 136, and signal engagement system 138. It can include one or more processors or services 140, user interface component 142, signal broadcast control component 144, signal service 146, and it can include a wide variety of other items 148 as well.

Signal configuration and control system 136 is shown as including configuration and control components 150 that allow a user 128 to access his or her personal intelligence profile 134 in order to generate one or more signals according to signal definitions, attributes and taxonomies 152 defined in system 136. System 136 can include other items 154 as well. User 128 can then access signal broadcast control component 144 in order to broadcast certain signals, as the user has defined them, for interaction by others. In one embodiment, the signals are broadcast by signal service 146. Signal service 146 can, for instance, be a server system that posts signals that are "broadcast" by various users, so those signals are accessible by other users or organizations. Service 146 also illustratively receives responses to the signals and makes those responses accessible to the user that posted the signal.

Signal engagement system 138 illustratively includes a set of engagement components 156 that are used by user 128 to interact with others who engage with (e.g., respond to) the user's broadcast signal or signals. For instance, the set of engagement components can include shopping system 158 that allows user 128 to engage with stores or other entities in performing shopping interactions. It can include predictive personal assistant system 160 that monitors a wide variety of different items with respect to user 128, including the user's preferences, the user's signals, and a wide variety of other information, and predictively generates suggestions for user 128. People, place, thing locator 162 illustratively locates people, places, and things of interest to user 128, based upon the user's interactions, the user's profile, etc. People interaction system 164 provides functionality to allow user 128 to interact with people, such as friends, co-workers, groups, etc. Place interaction system 166 allows user 128 to interact with information about various places, such as places of interest, vacation destinations, dining locations, etc. Review/report generator 168 illustratively allows user 128 to generate and view reports which summarize the people, places, things, etc. that user 128 has spent time on, has spent money on, or has otherwise interacted with over a specified period of time. Signal engagement system 138 can include a wide variety of other engagement items 170 as well.

Before describing the operation of personal intelligence platform 102 in more detail, a brief overview will first be provided. Platform 102 illustratively accesses information such as social profiles, social networking information, location-based discovery systems, information from mobile devices and on-line advertising systems, among others. Personal intelligence profile generator system 132 allows user 128 to generate a dynamic social profile (or have it automatically generated) that incorporates a user's search history, wish list information, demographic attributes (including, but not limited to geographic location, age, gender, etc.), behavioral attributes (including, but not limited to, search engine search history, social tags, health profile and financial profile information) among a wide variety of other information. It allows user 128 to tag people, places and things and organize them on their dynamic profile 134. Tags can be added to wish list items, which may be items that businesses or other organizations use to offer relevant advertisements and other offers. It allows user 128 to create both public and private wish lists that contain items or services that they would like to own. A profile owner (e.g., user 128) illustratively has control over their wish lists and can decide whether they would like to receive offers or advertisements based on their lists. Platform 102 then allows user 128 to discover people, places, things, etc., around them in a highly data-driven and personalized way.

Signal configuration and control system 136 allows user 128 to send out a "signal" on a wide area network (such as the Internet), or in a specific location, alerting businesses or organizations 110, and other users 130 of their signal. Configuration and control components 150 allow user 128 to set the specific data items that are contained in a user's signal and to generate a plurality of different signals (such as signals for friends, businesses, co-workers, etc.), each of which can contain different information. It allows user 128 to turn on or off his or her signals at any point in time.

Signal broadcast control component 144 broadcasts the signal (e.g., posts it on signal service 146), but only broadcasts those signals that user 128 has turned on. User 128 can illustratively turn on or off individual signals that are uniquely defined to discover people, places or things around them. User 128 thus illustratively has control over the privacy of his or her own data that is in his or her personal intelligence profile 134 and that is used in the various signals that user 128 defines. User 128, by turning on and off the signals, can thus share information with only people and entities they wish to, when they wish to, and with the types of organizations, they wish to share it.

Other users 130 or organization/business systems 110 can track the posted signals, that are broadcast by user 128, through signal service 146. They can then engage with the broadcast signals using various signal engagement systems, that correspond to the signal engagement systems 138 for user 128. Each signal engagement system 138 may illustratively be a separate application that generates its own user interface displays and that can allow user 128 to interact with those who engage (e.g., respond to) his or her broadcast signals, in different ways.

Figure 2:
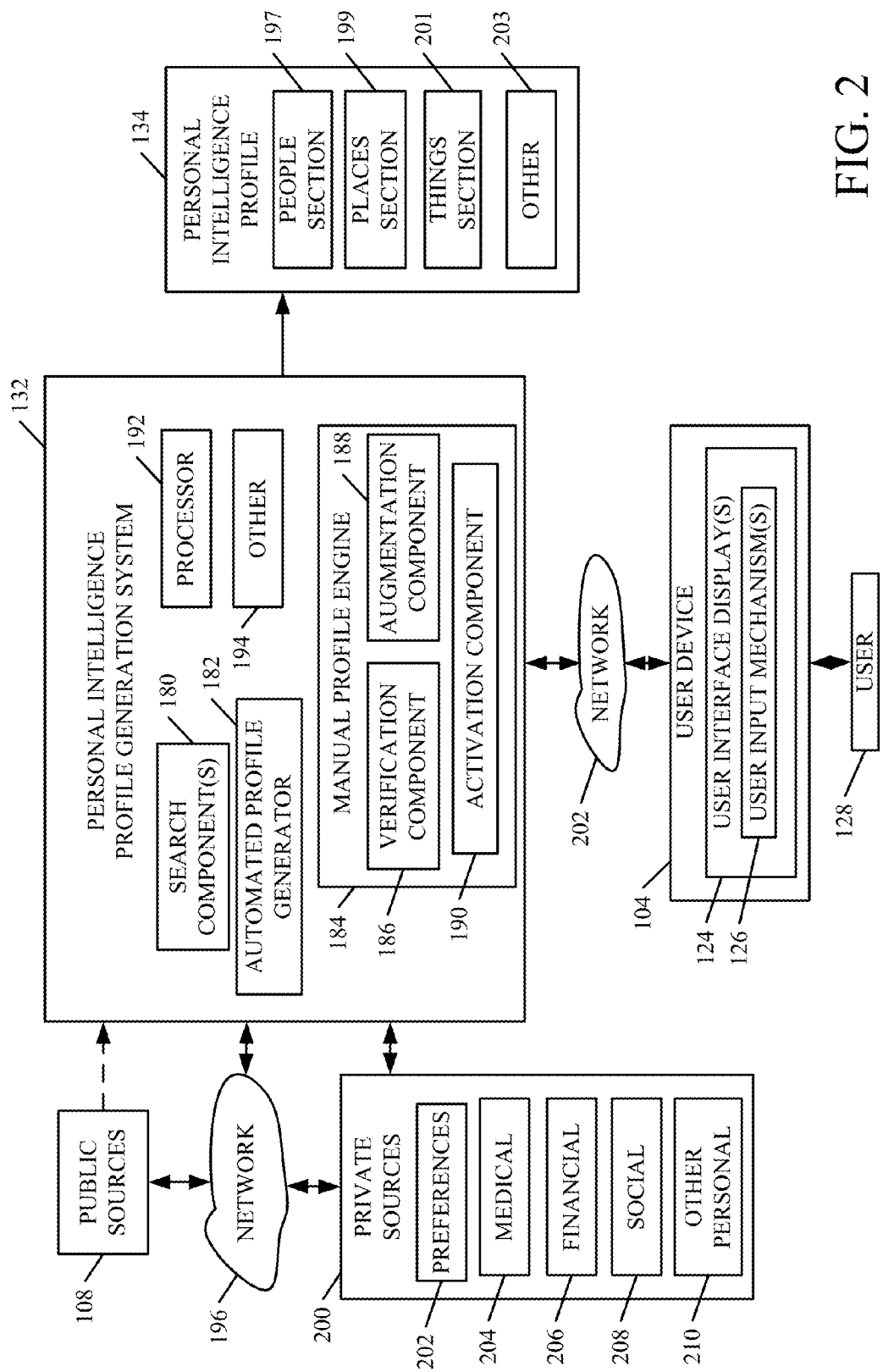
FIG. 2 is a more detailed block diagram of one example of a personal intelligence profile generator system.

FIG. 2 is a block diagram of one example of personal intelligence profile generator system 132. In the embodiment shown in FIG. 2, system 132 illustratively includes search components 180, automated profile generator 182, manual profile engine 184 (which, itself, includes verification component 186, augmentation component 188 and activation component 190) one or more processors or servers 192, and it can include other items 194 as well. System 132 is shown in FIG. 2 as accessing a wide variety of different sources of information either directly, or through network 196. The sources of information can include public sources of information 198 and private sources of information 200. Some examples of private sources of information 200 include user preferences 202, the user's medical information 204, the user's financial information 206, some of the user's private social information 208 and other personal information 210. System 132 is shown interacting with user device 104 so that user 128 can control and manipulate system 132 in order to generate the user's personal intelligence profile 134. In the embodiment shown in FIG. 2, profile 134 includes a people section 197, a places section 199, and a things section 201. Of course, it can include a wide variety of other information 203. A more detailed description of personal intelligence profile 134 is provided below.

Figure 3:
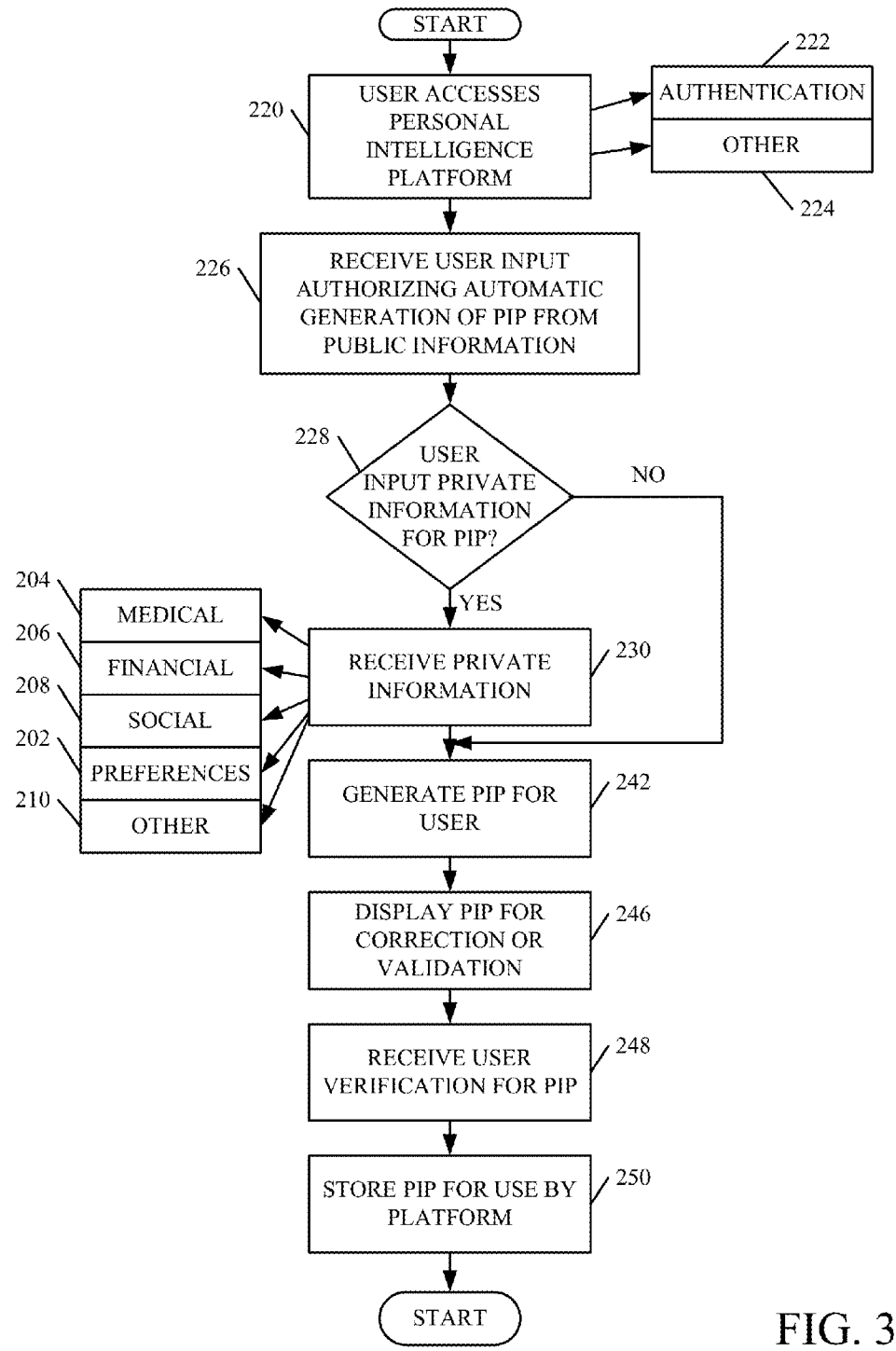
FIG. 3 is a flow diagram illustrating one example of the operation of the system shown in FIG. 2 in generating a personal intelligence profile.

FIG. 3 is a flow diagram illustrating one example of the operation of personal intelligence platform generator system 132. In the example shown in FIG. 3, user 128 first provides inputs to system 132 indicating that user 128 wishes to access system 132 within personal intelligence platform 102. This is indicated by block 220 in FIG. 3. This can be done in a wide variety of different ways. For instance, user 128 can provide authentication or other security-based information as indicated by block 222. This can include the user putting in a username and password, providing an RFID badge, using retinal scan or fingerprint detection or a wide variety of other authentication systems. This is indicated by block 224 in FIG. 3.

User 128 then provides inputs indicating to system 132 that the user authorizes system 132 to generate a personal intelligence profile from public information 198. This is indicated by block 226. It may be, for instance, that a great deal of public information is available in public sources 198 about user 128. After the user authorizes system 132, automated profile generator 182 illustratively uses search components 180 and other mechanisms to identify profile information about user 128, in public sources 198. The public sources may include siloed data, social network information, professional information that has been published about user 128, credit report information, blog posts or other information disseminated by user 128 or a wide variety of other information.

User 128 can also invoke manual profile engine 184 to input private information for being included in the user's personal intelligence profile 134. If the user elects to do this (as indicated by block 228 in FIG. 3) then user 128 authorizes augmentation component 188 to augment the information from public sources 198, with the information from private sources 200. Augmentation component 188 receives the information, as indicated by block 230. Again, as briefly mentioned above, user 128 can provide private information to engine 184 in the form of the user's medical records 204, the user's financial information 206, private social information 208, preferences 202 and other personal information 210. Some examples of the health records 204 can include mobile health records, health record privacy information, health record sharing information, health system integration information, employer-sponsored wellness programs, wearable health device information, personal health records, health tips, health alerts, health plan shopping information, health plan exchange information, fitness device information, etc. Some examples of financial information 206 can include mobile payment information, credit card payment information, financial planning information, direct payment information, financial investment information, financial assessment information, financial best practices or preferences, among a wide variety of other financial records. Personal social information can include social network passwords, account numbers, etc., so that augmentation component 188 can obtain social network information 236, contacts, friends, etc.

Verification component 186 allows user 128 to verify the information gathered from public sources 198. For instance, the user may be able to provide corrective information to correct credit score information, to indicate that certain social network information is not actually about the user, but about some other individual that may have a similar name, etc. In any case, system 132 then generates the personal intelligence profile 134 for user 128, based upon all the information that has been gathered. This is indicated by block 242.

It will be noted that the personal intelligence profile 134 can be generated by simply aggregating the data gathered by generator 182 and manual profile engine 184. However, information in the personal intelligence profile 134 can also be generated by analyzing that data to obtain derived personal intelligence information. For instance, system 132 can analyze items that user 128 has tagged (such as places, products, services) as well as the financial information indicating what types of things user 128 purchases. System 132 can analyze this information to derive interests or other personal intelligence information or patterns or correlations about user 128.

In addition, the personal intelligence profile 134 can be dynamic, in that it can be continuously or intermittently updated. For instance, system 132 can take into account the calendar and communications by user 128. By way of example, system 132 can consider the tasks and meetings that are scheduled for user 128, along with the user's current travel arrangements, and the transportation mechanisms in the area of the user's current location, as well as the traffic patterns. All of this information can be used in generating personal intelligence profile 134. Some examples are described in more detail below.

Once the personal intelligence profile 134 is generated, it can illustratively be provided to user 128 (such as through a display or other user interface) for correction or validation. This is indicated by block 246 in FIG. 3. When the personal intelligence profile meets the user's expectations and approval, or at any other time, user 128 can provide an activation input to activation component 190 to activate the user's personal intelligence profile 134 within platform 102. Receiving the user activation input is indicated by block 248. System 132 then stores the user's personal intelligence profile 134 for use by platform 102. This is indicated by block 250.

Figure 4:
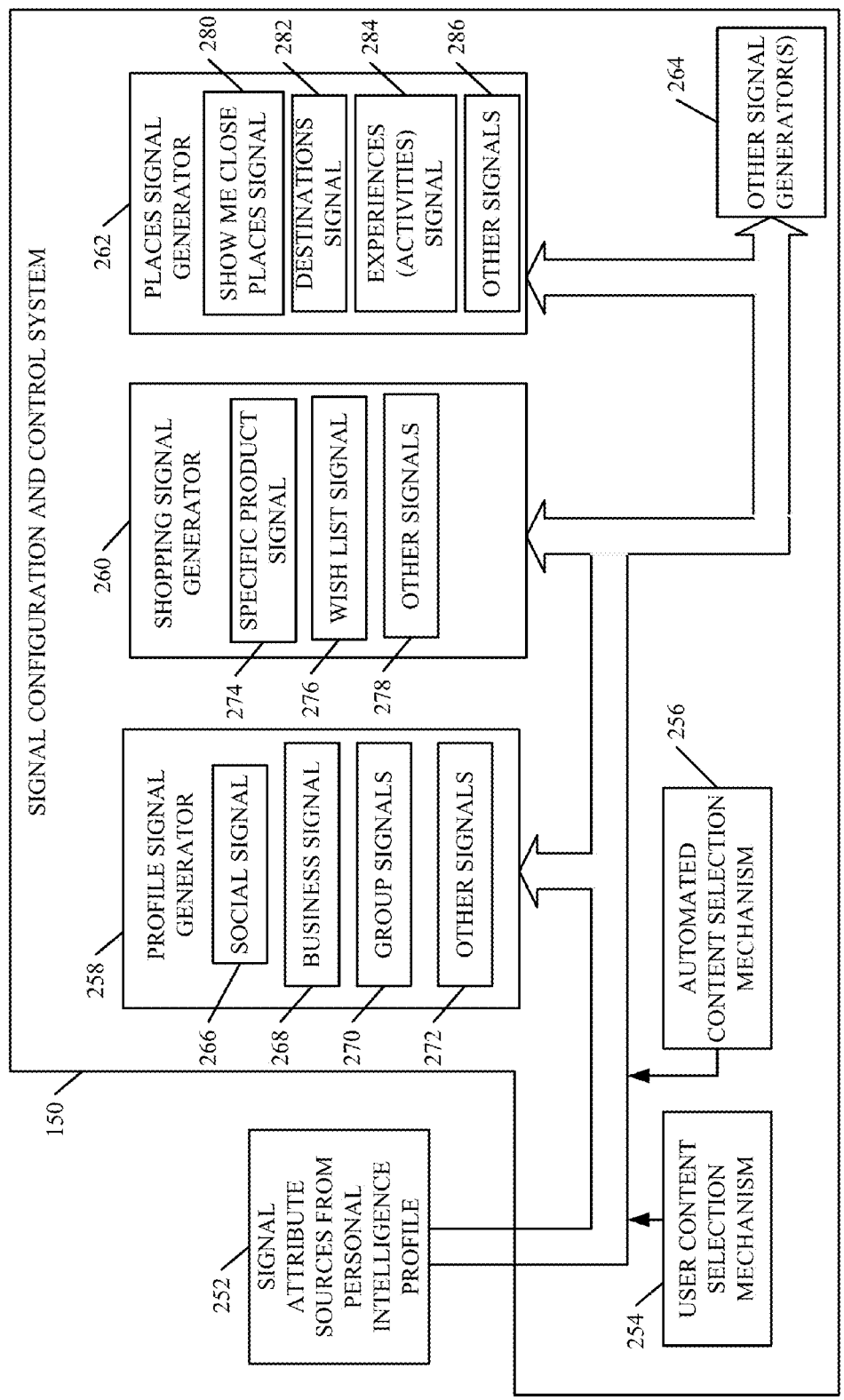
FIG. 4 is a block diagram showing one example of a set of configuration and control components that a user can use to configure and control a signal that is posted using information from the user's personal intelligence profile.

Once the user has generated and activated a personal intelligence profile 134, user 128 can access signal configuration and control system 136 to configure the various signals that the user wishes to define. FIG. 4 is a block diagram showing one example of configuration and control components 150 in system 136, in more detail. It can be seen in FIG. 4 that components 150 illustratively have access to signal attribute sources from personal intelligence profile 134 for user 128. The signal attribute sources are illustratively comprised of the data that forms personal intelligence profile 134 for user 128. The signal attribute sources from the personal intelligence profile are indicated by block 252 in FIG. 4.

FIG. 4 shows that, in one embodiment, configuration and control components 150 also include a user content selection mechanism 154 and an automated content selection mechanism 256, as well as a people signal generator 258, a shopping signal generator 260 and a places signal generator 262, among a wide variety of other signal generators 264. People signal generator 258 illustratively includes mechanisms for defining one or more social signals 266, one or more business signals 268, one or more group signals 270, and other people signals 272. User 128 illustratively uses user content selection mechanism 254 to select the content from the user's personal intelligence profile 134 that will be included in each of the signals. For instance, the user may include a variety of social network information in the user's social signal 266 that is sent to the user's friends. However, the user may decide to only include professional information from his or her profile 134 to be included in the business signal 268 that is made available to the user's work colleagues. The user may include group-specific information from his or her profile 134 that is included in various group signals 270. In one embodiment, user 128 can also authorize automated content selection mechanism 256 to automatically select content from the user's profile 134 to be included in the various signals.

In the embodiment shown in FIG. 4, shopping signal generator 260 is used by user 128 to define specific product signals 274, wish list signals 276 and other shopping related signals 278. The specific product signal 274 may be used by user 128 to indicate to merchants, social groups, etc., that the user is interested in purchasing a specific product. The wish list signal 276 may be used by user 128 to define a wish list of items that the user may desire, and the other shopping signals 278 can be used to define other shopping related things.

Places signal generator 262 illustratively allows user 128 to define a close proximity signal 280 that is broadcast by user 128 so that the user can see places of interest to the user that are in close proximity to user 128. Destinations signal 282 may be defined by user 128 to define vacation destinations or day trip destinations that the user may wish to take.

Experience or activities signal 284 may be defined by user 128 to indicate various experiences that the user is interested in having. Of course, the user can generate signals related to places in other ways as well, and this is indicated by block 286.

Figure 5:
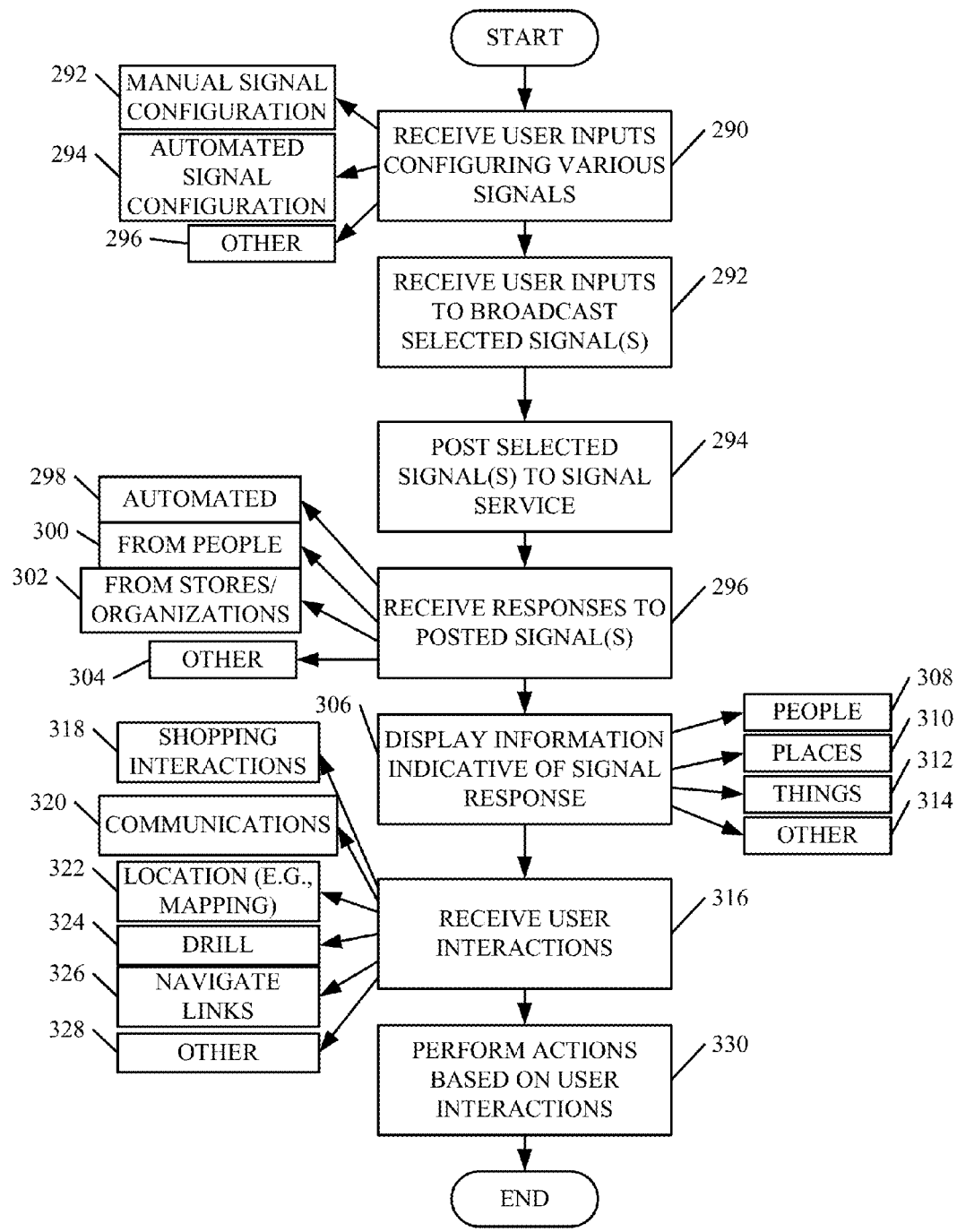
FIG. 5 is a flow diagram illustrating one example of the operation of the components shown in FIG. 4.

FIG. 5 is a flow diagram illustrating one example of the operation of configuration and control components 150 in signal configuration and control system 136, in more detail. System 150 first receives user inputs configuring the various signals (e.g., defining what profile information will be reflected in each of the various signals) that the user wishes to define. This is indicated by block 290 in FIG. 5. Again, the signals can be generated based on the user 128 using user content selection mechanism 254 to manually indicate which types of information are to be included in which types of signals. This is indicated by block 292. The user can also authorize automated content selection mechanism 256 to automatically select content for inclusion in various signals, and to even automatically define different signals, on its own. This is indicated by block 294. Receiving the user input to configure the signals can be done in other ways as well, and this is indicated by block 296.

Figure 5A:
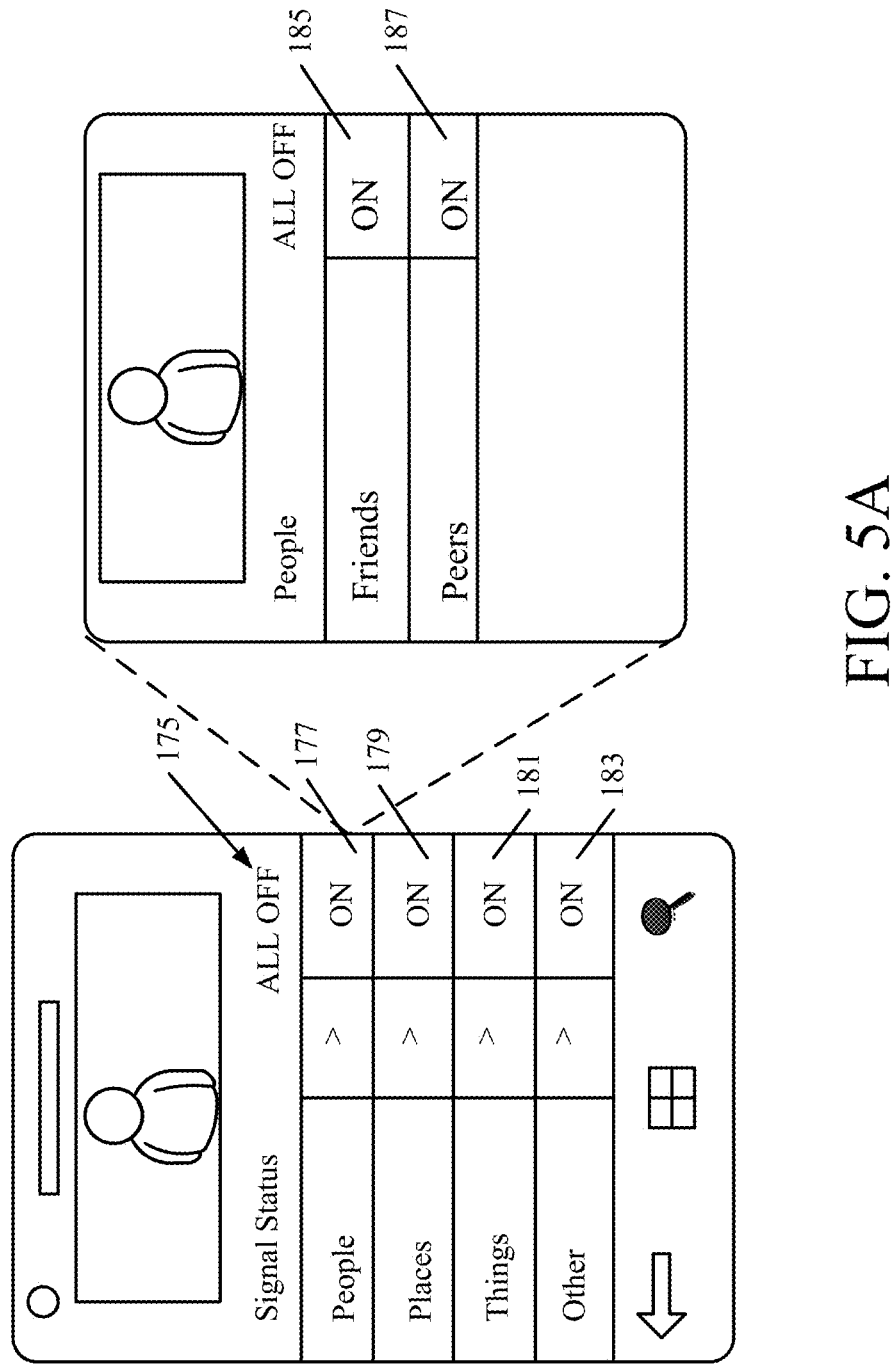
FIGS. 5A-5I show examples of user interface displays.
Figure 5B:
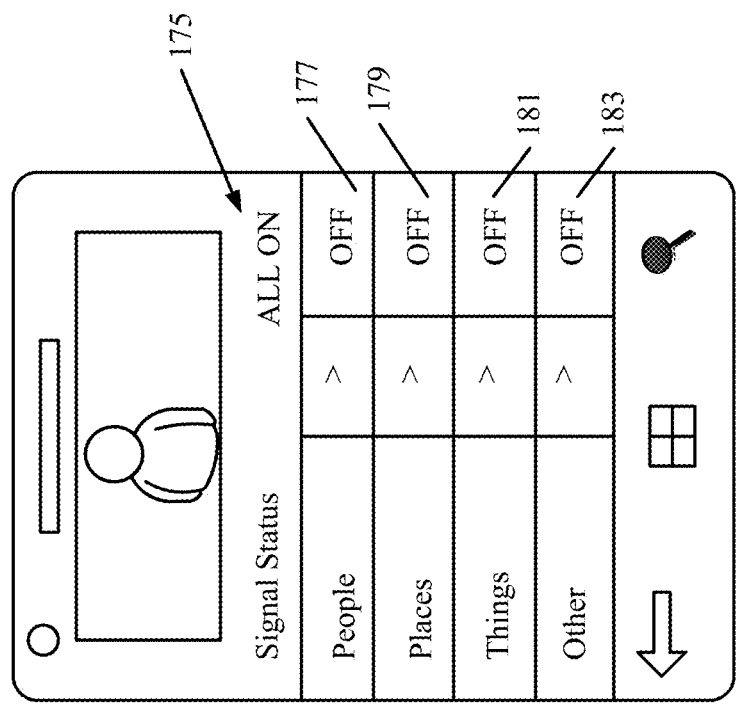

Signal broadcast component 144 then receives user inputs from user 128 indicating that user 128 wishes to broadcast selected signals, that the user has configured. This is indicated by block 292 in FIG. 5. This can be done in a wide variety of different ways. FIGS. 5A and 5B show a set of user interface displays that indicate this. FIG. 5A, for instance, shows that the user is viewing a user interface display 175 on a mobile device. The user interface 175 shows different categories of signals that the user has configured in system 150. The signals include people signal 177, places signal 179, things signal 181 and other signals 183. FIG. 5A also shows that, in one embodiment, each signal may have a plurality of individual signals. For instance, the people signal 177 can be broken into two separate signals, one corresponding to friends 185 and another corresponding to peers 187. The user interface displays shown in FIG. 5A allow user 128 to turn on or off any of the given signals by using touch gestures or any other types of inputs. FIG. 5A shows that all of the signals are on, and FIG. 5B shows that all of the signals are off. Of course, they can be turned on or off individually as well.

When the user has turned on one or more signals, then signal broadcast control component 144 broadcasts that signal to receive responses. In one example, this includes posting the signal to signal service 146, where it can be accessed by other users 130 and optionally other organizations or business systems 110. In one example, different signals will only be available to different users 130 or organization/business systems 110. For instance, the friends people signal may only be available to certain identified users 130, specified by user 128 and not to any businesses. This is only one example. Posting the selected signals to the signal service is indicated by block 294 in FIG. 5.

Once the signals are posted, user 128 engages with individuals or organizations that respond to the posted signals through signal engagement system 138. Receiving responses to the posted signals is indicated by block 296 in FIG. 5. Different users or systems may respond in different ways. Sometimes, the responses may be automated as indicated by block 298. For instance, where a business configures its system to scan posted signals on signal service 146 to identify potential customers with interest in their products, this scanning can be done automatically and the business can respond to the posted signal automatically, such as with a personalized offer, an advertisement, etc. The responses can also be manual, such as from people. This is indicated by block 300. They can be from stores or organizations, such as charitable organizations, churches, schools, etc. This is indicated by block 302. The responses can be received in other ways, and from other people as well. This is indicated by block 304.

Figure 5C:
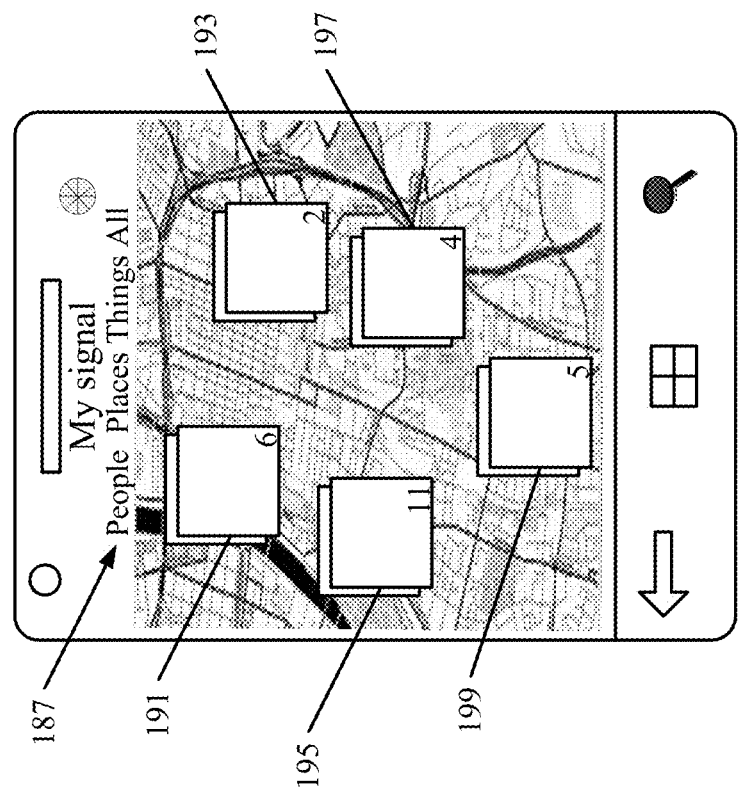
Figure 5D:
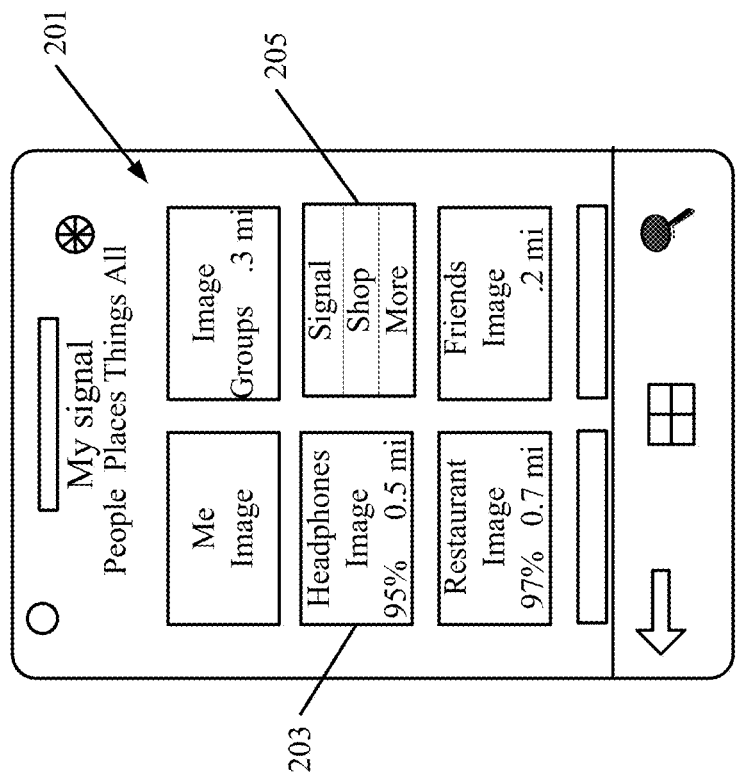

Signal engagement system 138 then uses one of the signal engagement components 156 to display or otherwise notify user 128 of information indicative of the signal responses. This is indicated by block 306 in FIG. 5. For instance, the signal engagement system 138 can break the responses into categories that are either predefined, or that are configured by user 128. In one example, the categories are people 308, places 310, and things 312. Of course, there can be a wide variety of different or additional categories or subcategories as well, and this is indicated by block 314. FIGS. 5C and 5D show examples of user interface displays on a mobile device that indicate this.

FIG. 5C, for instance, shows user interface display 187 on a mobile device. In the example, the user has configured the device to broadcast signals corresponding to people, places and things. Display 187 shows a display element 191 corresponding attractions, a display element 193 corresponding to friends, a display element 195 corresponding to restaurants, a display element 197 corresponding to products and display elements 199 corresponding to groups. Each display element can include a quality indicator and can be mapped to an underlying map. For instance, display 187 shows that there are six attractions, eleven restaurants, two friends, five groups and four products that are relevant to user 128, based upon the current signals that user 128 is broadcasting. FIG. 5D shows yet another user interface display 201. Display 201 shows display elements corresponding to the different signals the user is broadcasting. Each display element shows items of interest corresponding to the signals, and also indicates how far those items are located from the user's current location, as well as an indication as to how well they match the user's signal. For instance, it may be that a user's specific product signal defines a set of headphones that the user is interested in, in a certain price range. It may be that a business has responded to the user's signal indicating that it has those headphones, but that they are priced slightly above the user's price range. Therefore, FIG. 5D shows an image 203 of a set of headphones that have a 95% match to the user's signal and indicates that they are at a retailer that is a half mile away. These are only examples of user interface displays.

Signal engagement system 138 can then receive user interactions with the displayed information. This is indicated by block 316 in the flow diagram of FIG. 5. The actions can take a wide variety of different forms. For instance, they can be shopping interactions 318, communications 320, location (e.g., mapping) interactions 322, they can be drill down interactions 324, they can be navigation actions to navigate displayed links, as indicated by block 326, or they can be a whole host of other interaction 328. In response, signal engagement system 138 performs actions based on the user interactions. This is indicated by block 330.

Figure 6:
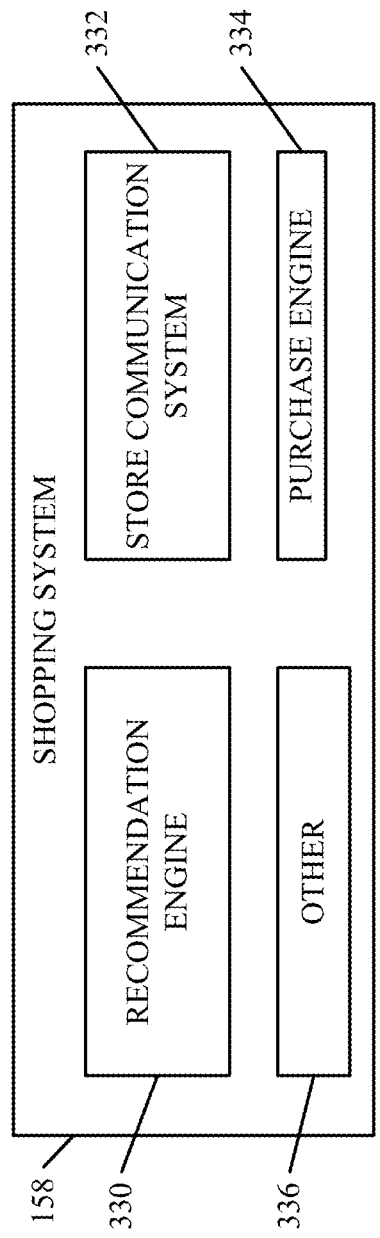
FIG. 6 is a more detailed block diagram of one example of a shopping system.

In one example, based upon the user interactions, signal engagement system 138 launches a signal engagement component (such as an app) corresponding to the user's interaction. By way of example, assume that the user wishes to perform shopping interactions. In that case, the user may interact with a displayed product item. FIG. 6 shows a block diagram of one example of a shopping system (or shopping app 158) in more detail. It can be seen in FIG. 6 that shopping system 158 includes a recommendation engine 330, a store communication system 332 and purchase engine 334, and it can include a wide variety of other items 336 as well. The recommendation engine 330 can illustratively generate recommendations for various products, for which the user has broadcast a signal, and generate a display showing those recommendations. Store communication system 332 allows user 128 to communicate with the merchants that have responded to the user's signal for a given product or set of products, and purchase engine 334 illustratively allows user 128 to actually make purchases on-line, using his or her device.

Figure 5E:
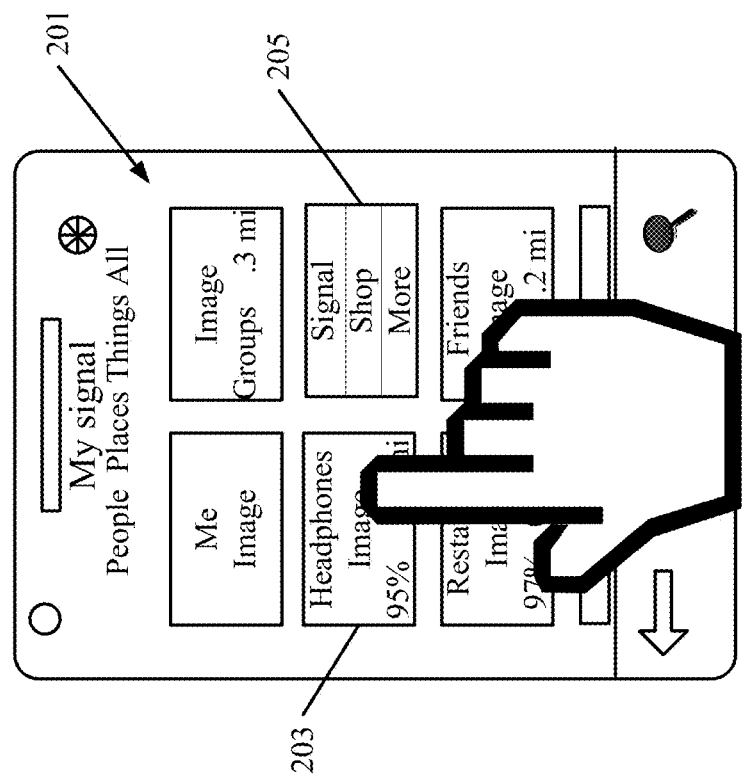

For instance, FIG. 5E shows a user interface display where the user has actuated the headphone product image 203. The user can then actuate a "shop" user input mechanism 205. In response, this may launch shopping system 158 in signal engagement system 138 to identify local merchants that may have products fulfilling the user's shopping signal (e.g., the specific product signal). Shopping system 158 then illustratively generates a user interface display indicating this.

Figure 5F:
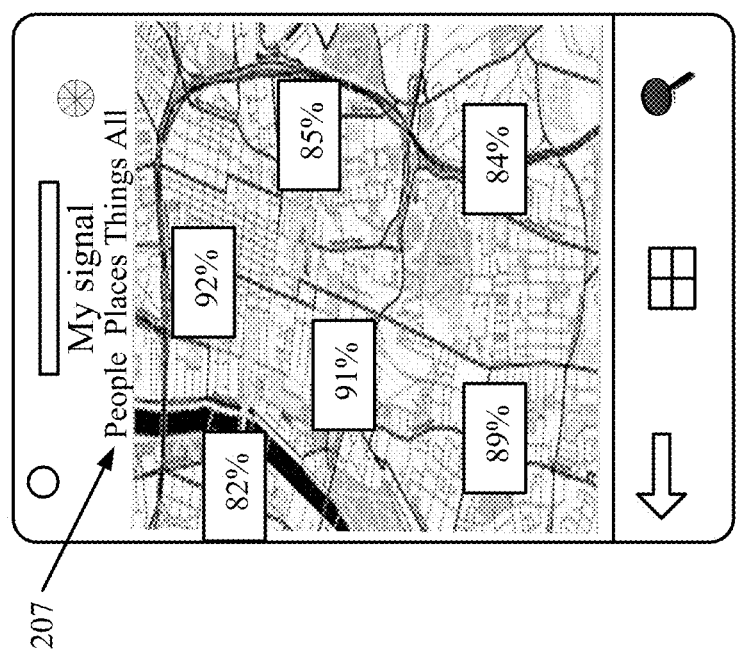
Figure 5G:
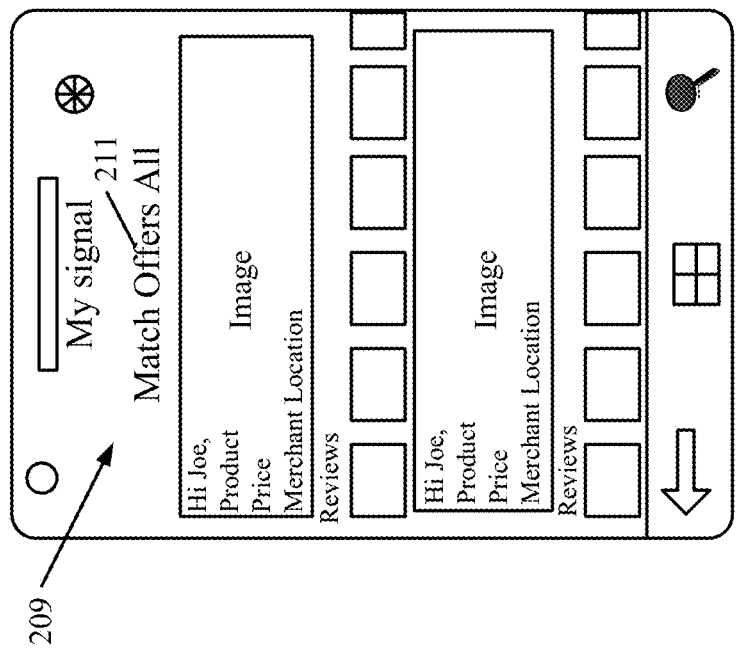
Figure 5H:
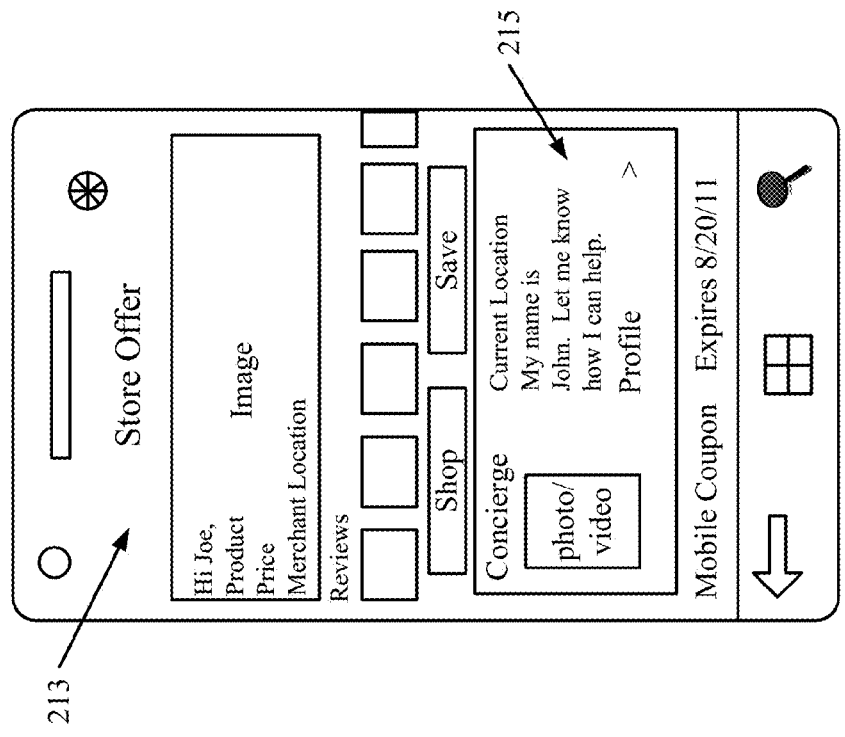
Figure 5I:
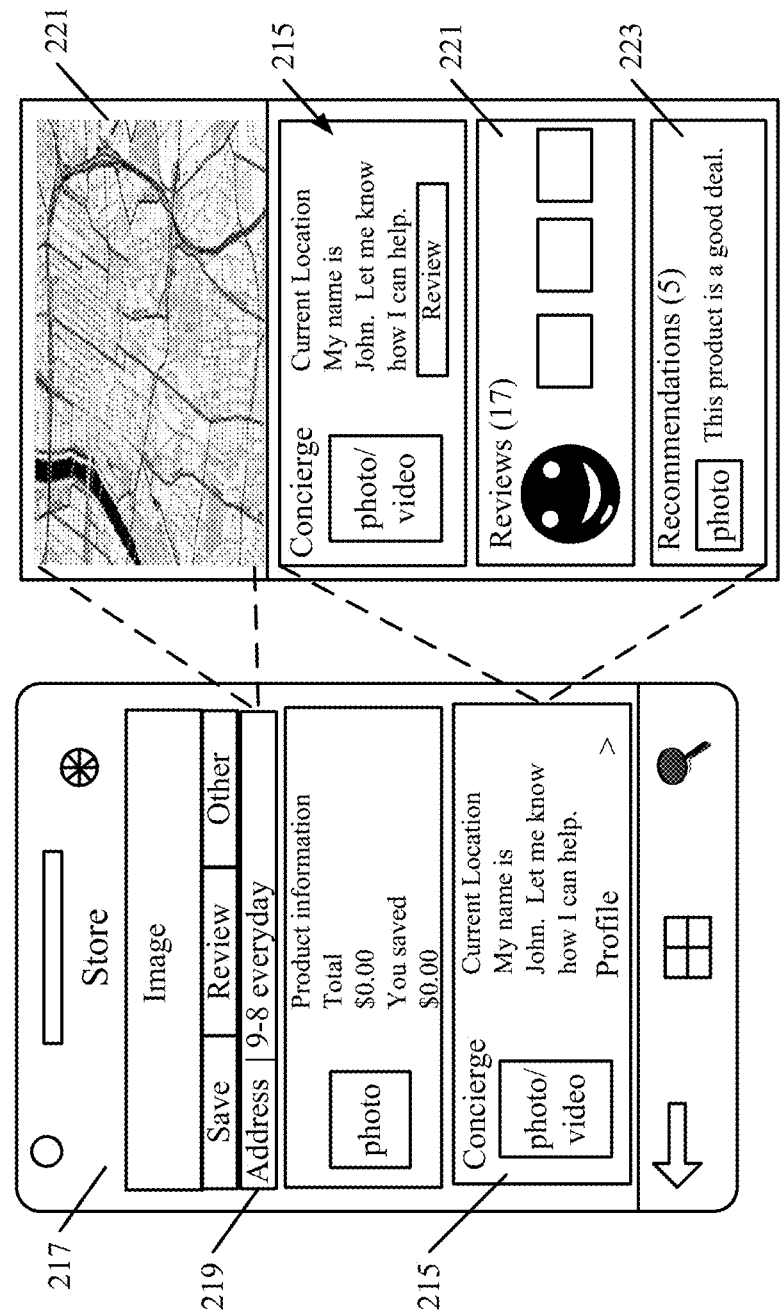

FIG. 5F shows one example of a user interface display 207 in which merchants are shown, relative to user 128, on a map display and each of them are represented by a display element that locates them on the map and each display element has a score that indicates how well the merchant's products match the user preferences, based upon all of the personal intelligence information included in the user's shopping signal that the merchants are responding to. FIG. 5G shows an example of a user interface display 209 where the user has selected to compare the products offered by the different merchants. For instance, the user can actuate a user input mechanism (such as the offers user input mechanism 211) to see various offers that the merchants are making in response to the user's shopping signal. FIG. 5H shows one example of a user interface 213 that can be generated when the user has selected a merchant with which to interact. For instance, the user can select a display element corresponding to a merchant in FIG. 5G, or provide another input indicating the user wishes to shop at a merchant. It can be seen that FIG. 5H includes a concierge interface display section 215 where the user can actually interact with someone at the business location to answer questions, receive additional pricing or location information, receive or use information regarding discounts, offers, loyalty programs, coupons, or a wide variety of other information. FIG. 5I is an example of a user interface display 217 that shows that the user can, in one example, purchase the product on-line, through the shopping system app 158, pay for the item, receive a receipt as well as loyalty rewards. The user can also receive directions indicating where to go to pick up the item just purchased.

For instance, the user can actuate the address user input mechanism 219 for the merchant where the user purchased the item, and a map display 221 can be displayed with directions to the store. FIG. 5I also shows that the user can scroll the concierge display 215 to see a reviews section 221 that shows reviews by the user's friends or others, and a recommendations section 223 that shows recommendations. These are examples only.

Figure 7:
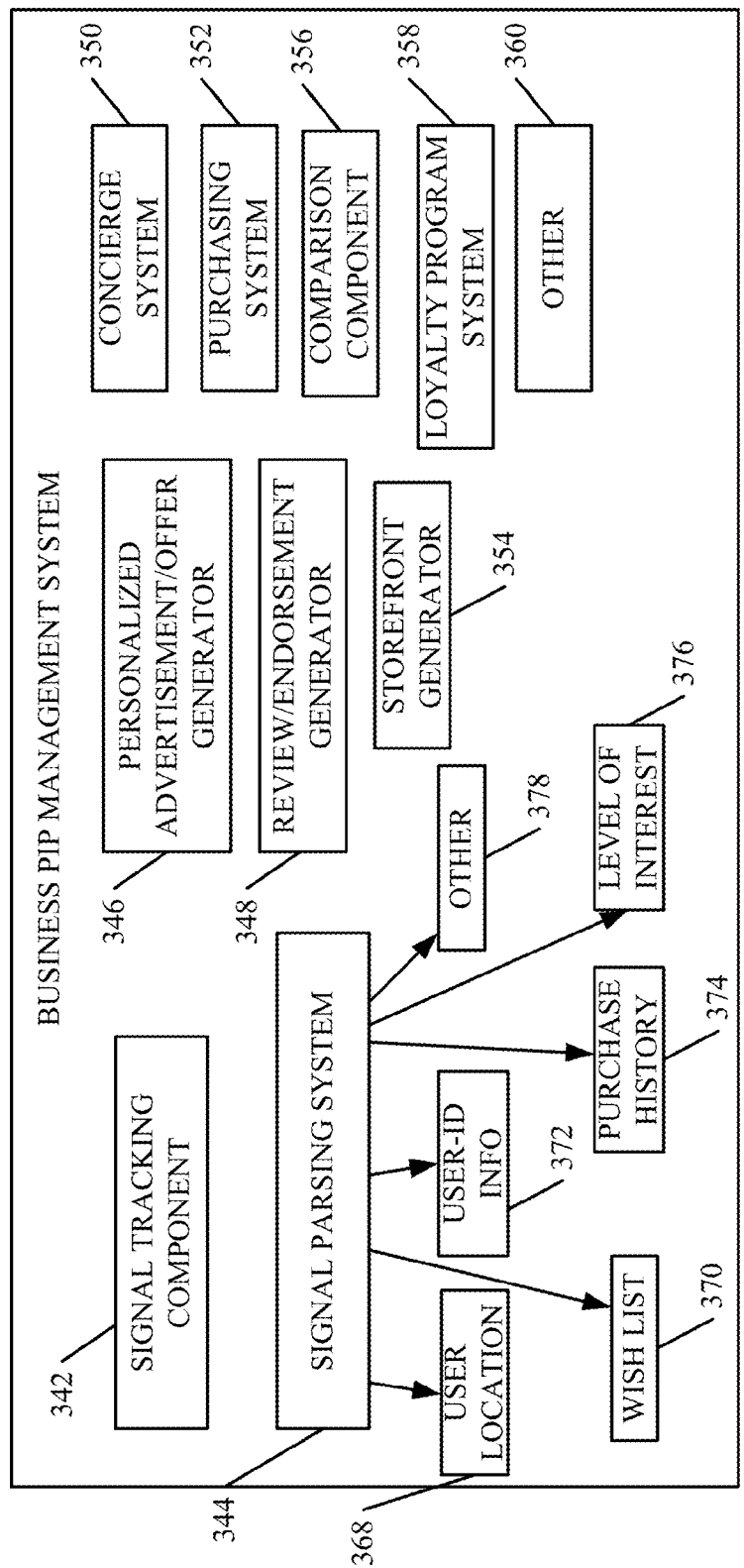
FIG. 7 is a more detailed block diagram of one example of a business or organization personal intelligence profile management system.

FIG. 7 is a block diagram of one example of a business personal intelligence platform management system 340. System 340 can be used by organizations or business systems 110 to respond to signals broadcast by various users, or to broadcast their own signals that can be searched by users. System 340 can include signal tracking component 342, signal parsing system 344, personalized advertisement/offer generator 346, review/endorsement generator 348, concierge system 350, purchasing system 352, storefront generator 354, comparison component 356, loyalty component 358, and it can include a host of other or different items 360 as well.

Figure 8:
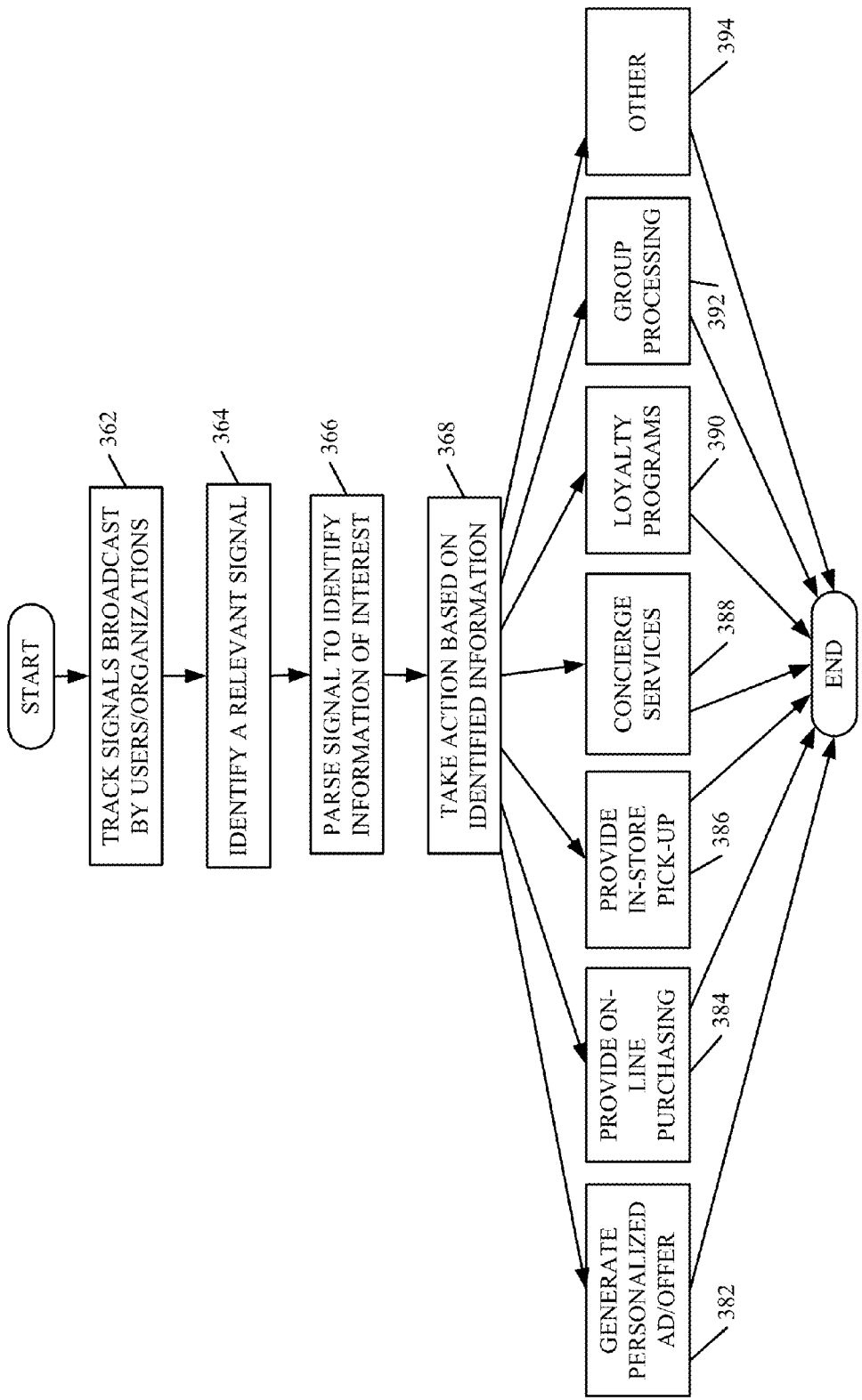
FIG. 8 is a flow diagram illustrating one example of the operation of the system shown in FIG. 7.

FIG. 8 is a flow diagram illustrating one example of business personal intelligence platform management system 340. Signal tracking component 342 first illustratively tracks signals that are broadcast by various users or other organizations. This is indicated by block 362 in FIG. 8. It can identify relevant signals, that are relevant to the business being conducted by the organization that's deploying business personal intelligence platform management system 340. Identifying relevant signals is indicated by block 364. Once a relevant signal is identified, signal parsing system 344 illustratively parses the signal to identify information of interest. This is indicated by block 366. The information of interest can be a wide variety of different types of information that are included in the relevant signal. For instance, it can include user location information 368, user wish list information 370, user identifying information 372, user purchase history information 374, level of interest indicators 376, and other information 378. It can determine how closely the user's signal corresponds to the products or services that the business offers.

It can then determine what types of actions to take with respect to that user. Taking actions based upon the identified information is indicated by block 380 in FIG. 8. In one example, personalized advertisement/offer generator 346 can generate personalized advertisements or offers for user 128. This is indicated by block 382. The personalized advertisements or offers may include the user's name or other identifying information, and other personal information shared by the user in the user's signal.

Purchasing system 352 can provide on-line purchasing services that allow user 128 to purchase items. This is indicated by block 384. The purchasing system 352 can also provide instructions, for example, for in-store pickup. This is indicated by block 386.

Concierge system 350 can provide concierge services. This is indicated by block 388. For instance, the concierge services can be used to answer questions that user 128 may have, to provide additional information about the programs, warranties, loyalty programs, etc., offered by the organization, or a wide variety of other information. Loyalty program system 358 can automatically generate loyalty program points or other rewards for user 128. This is indicated by block 390. Review/endorsement generator 348 can generate reviews or endorsements from social network acquaintances or other friends of user 128. It can also generate group discounts for groups of users. This is indicated by block 392. The types of actions can include a wide variety of other actions 394 as well. In one example, during all of these interactions, storefront generator 354 can generate an on-line storefront for user 128.

Figure 9:
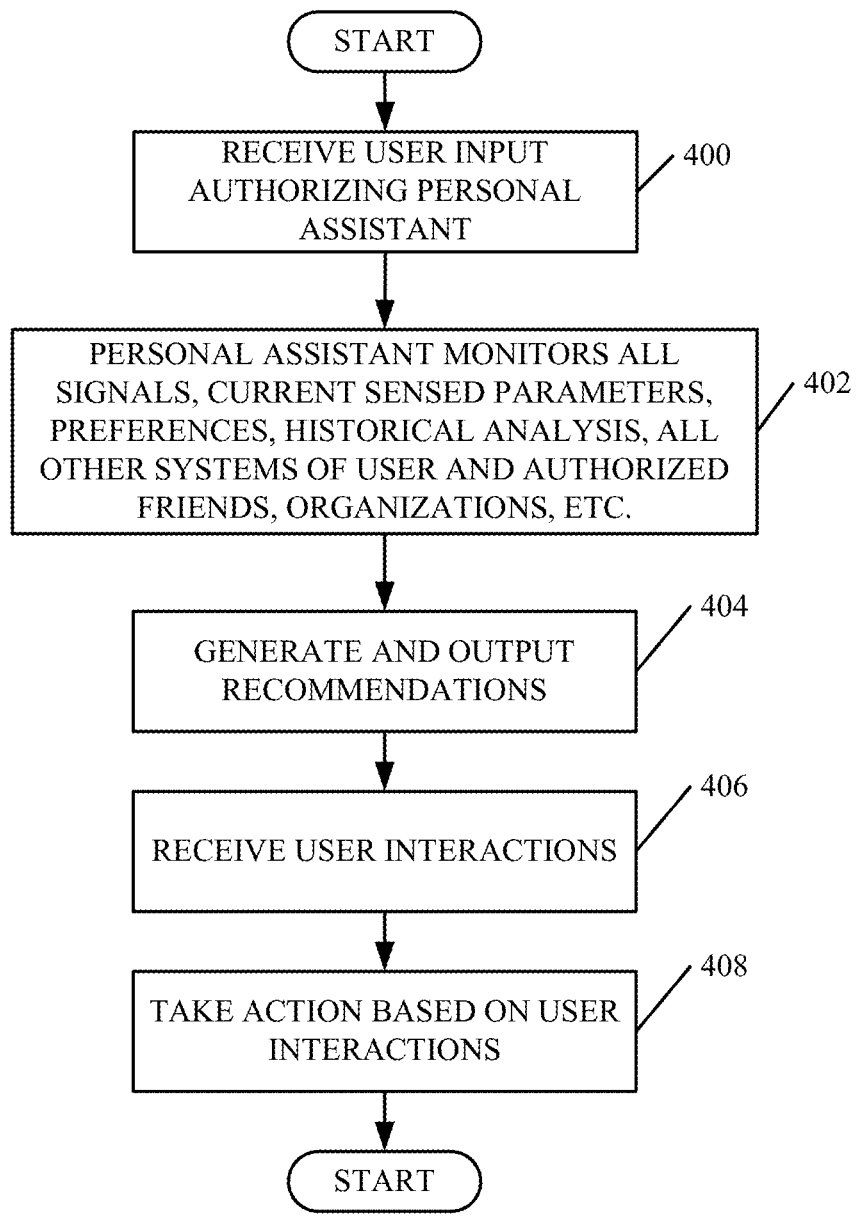
FIG. 9 is a flow diagram illustrating one example of the operation of a predictive personal assistant system.

FIG. 9 is a flow diagram illustrating one example of the operation of predictive personal assistant system 160 in signal engagement system 138. It will first be understood that user 128 illustratively provides user inputs authorizing predictive personal assistant system 160 to engage with the user's personal intelligence profile 134. This is indicated by block 400 in FIG. 9.

The predictive assistant 160 then monitors all signals configured by user 128, current sensed parameters, such as the user's location, the weather, the traffic at the user's location, it accesses information about other items in the user's vicinity, it monitors that user's calendar, and preferences, it can perform historical analysis on what the user has done before during this period of the day, on this day of the week, during this month, etc. It can monitor all other systems of the user and even authorized friends (such as their calendars, locations, etc.) of the user and authorized organizations of the user. Monitoring all these types of information is indicated by block 402.

Predictive assistant 160 can then generate and output recommendations for user 128. This is indicated by block 404. The recommendations can take a wide variety of different forms. For instance, assume that the user is at work, and the assistant 160 identifies that the child son has a soccer game or other sporting event that is scheduled to begin within an hour. Assistant 160 can identify this information by accessing the user's calendar or the child's calendar. Assume also that the assistant 160 accesses a traffic website and identifies heavy traffic on the most direct route between the user's work and the child's soccer gamer. Assume further that the predictive assistant 160 accesses a weather site and determines that it is likely to rain at the location of the child's soccer game, at the time that the game is to be played. In that case, predictive assistant 160 can generate and output a recommendation to the user suggesting an alternate route to the soccer game, suggesting that the user leave at a certain time given the heavy traffic and further suggesting that the user take an umbrella or raincoat.

In another scenario, assume that predictive assistant 160 accesses the archives of the user's calendar and finds that the user has canceled three consecutive "date nights" with the user's spouse. Assume that predictive assistant 160 also identifies, on the user's calendar, that tonight is a date night. Assume further that the predictive assistant 160 accesses the user preferences or signals regarding dining, and similar signals for the user's spouse, and identifies a favorite restaurant for the user and the user's spouse. In that case, predictive assistant 160 illustratively generates a recommendation to the user suggesting that the user leave work early, and reminding the user that it is his or her date night. The recommendation may also ask the user whether the user wishes to have predictive assistant 160 contact a babysitter and make a reservation at the restaurant, or place a take-out order from the identified restaurant. If so, the user can provide a simple input acknowledging that predictive assistant 160 should take action (e.g., place the take-out order) and display directions to the user's favorite restaurant and an estimated time when the food will be available for pickup.

In another scenario, assume that the user takes a given route to work regularly. Using an accelerometer on the mobile device of the user, assume that predictive assistant 160 identifies a location on the route to work where the user consistently hits a pothole or otherwise a rough patch of road. In that embodiment, predictive assistant 160 can illustratively generate a recommendation that indicates that it appears that the user is hitting a pothole at that same location frequently. The recommendation may also ask the user whether the user wishes the predictive assistant 160 to send a request to the highway department (or other relevant department) reporting the pothole and inquiring about information as to when it is going to be repaired.

Of course, all of the above examples of recommendations are just that, examples. A wide variety of other recommendations can be generated as well.

In any case, in some examples, user 128 can interact with the recommendations (such as authorizing the predictive assistant 160 to order take-out, send a letter to the highway department, etc.). Receiving user interactions is indicated by block 406. Predictive assistant 160 can then use the various systems in platform 102, or on the user device 104, or other devices, to take action based on the user interactions. This is indicated by block 408.

Figure 10:
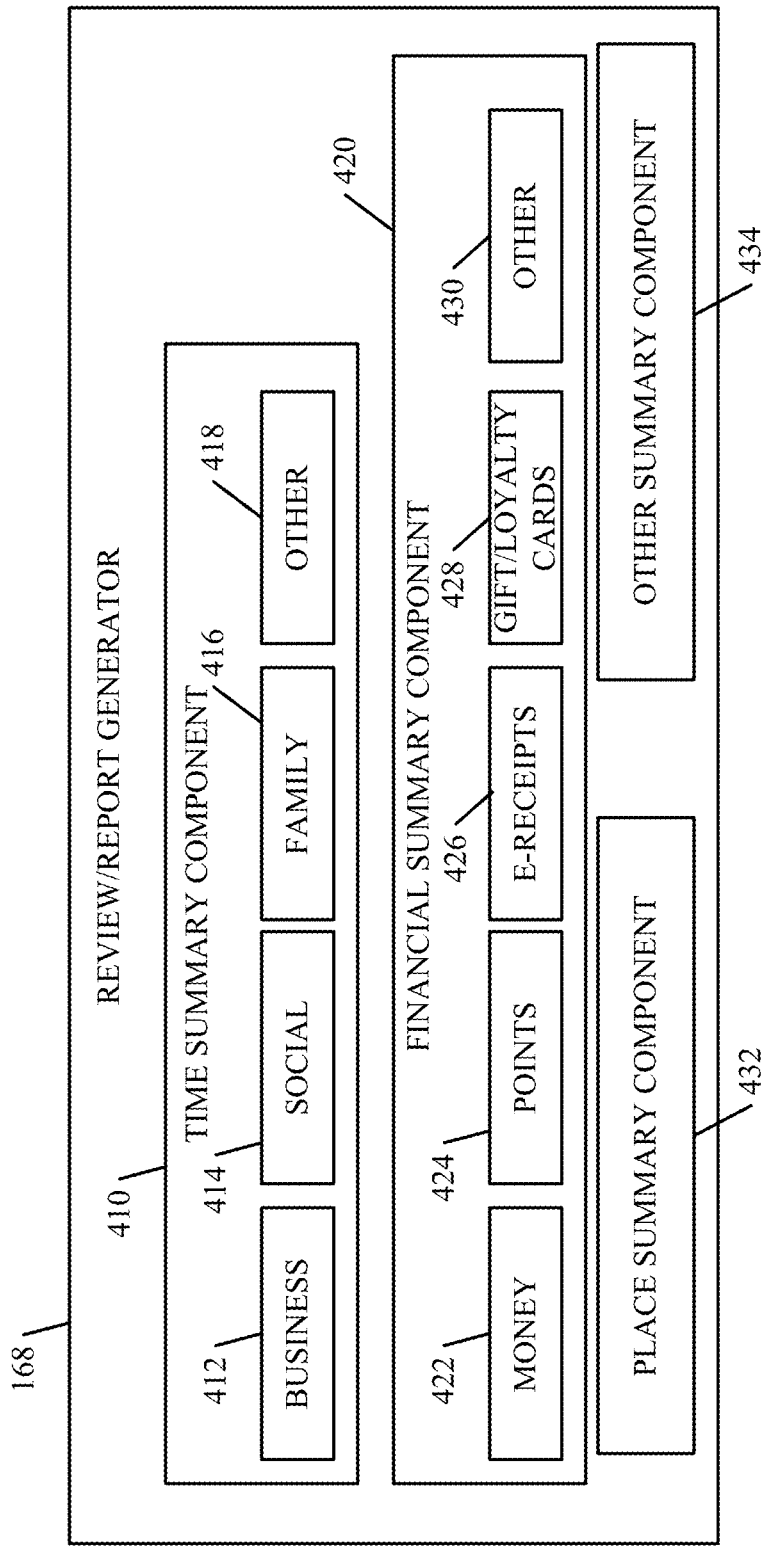
FIG. 10 is a more detailed block diagram of one example of a review and report generator.

FIG. 10 shows one embodiment of a block diagram of review/report generator 168 in more detail. It can be seen in the example shown in FIG. 10 that review/report generator 168 includes a time summary component 410, that itself, summarizes time spent on business activities 412, social activities 414, family activities 416, and other activities 418. Generator 168 also includes financial summary component 420 that summarizes the amount of money spent on various categories, as indicated at 422, the amount of loyalty points spent 424, it summarizes electronic receipts, gift and loyalty card purchases 428, and other financial items 430. Place summary component 432 illustratively generates summaries of various places that user 128 has spent time or resided in, over a predetermined period of time. It can of course include other summary components 434 as well. Review/report generator 168 can be invoked by user 128 to display the summary information in a wide variety of different forms.

Figure 10A:
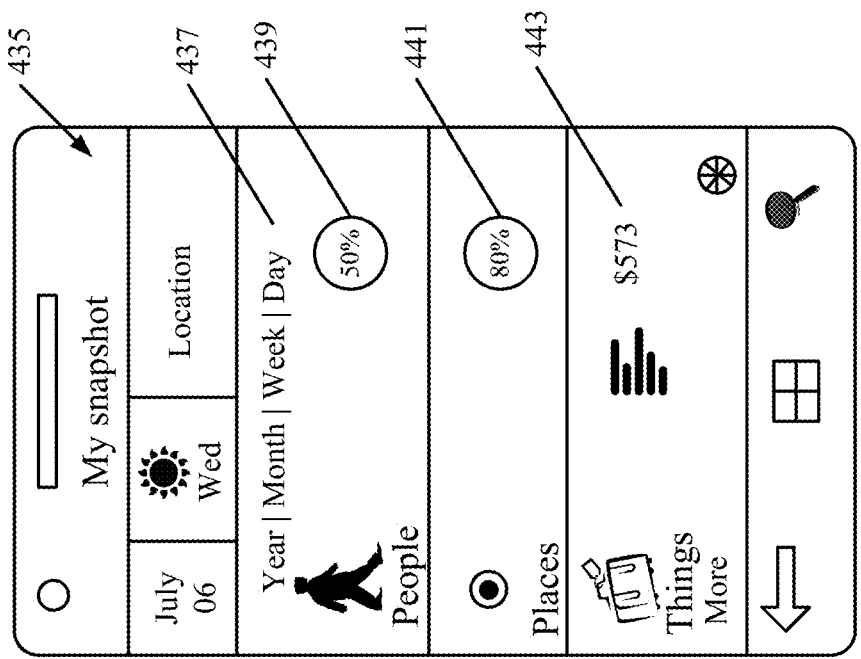
FIG. 10A is one example of a user interface display.

FIG. 10A, for instance, shows one example of a user interface display 435 with a period selector 437 that allows the user to specify a summary reporting period (such as year, month, week, day, etc.). It also shows sections corresponding to people 439, places 441 and things 443. Each section can include various graphics that show expenditures of time and money (or other things). In the example shown, display 435 indicates where the user spent time, money, earned points, etc., over the previous week. In the example shown in FIG. 10A, the user interface display shows the amount of time spent with various people (such as family, friends, work, etc.), places, and the amount of money spent on various things or activities.

It will be noted that these are examples only. A wide variety of other examples can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands. The "displays" can be other outputs, such as audio or haptic outputs. The input mechanisms can sense audio inputs or haptic inputs (such as shaking or rotating the user's phone).

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 11:
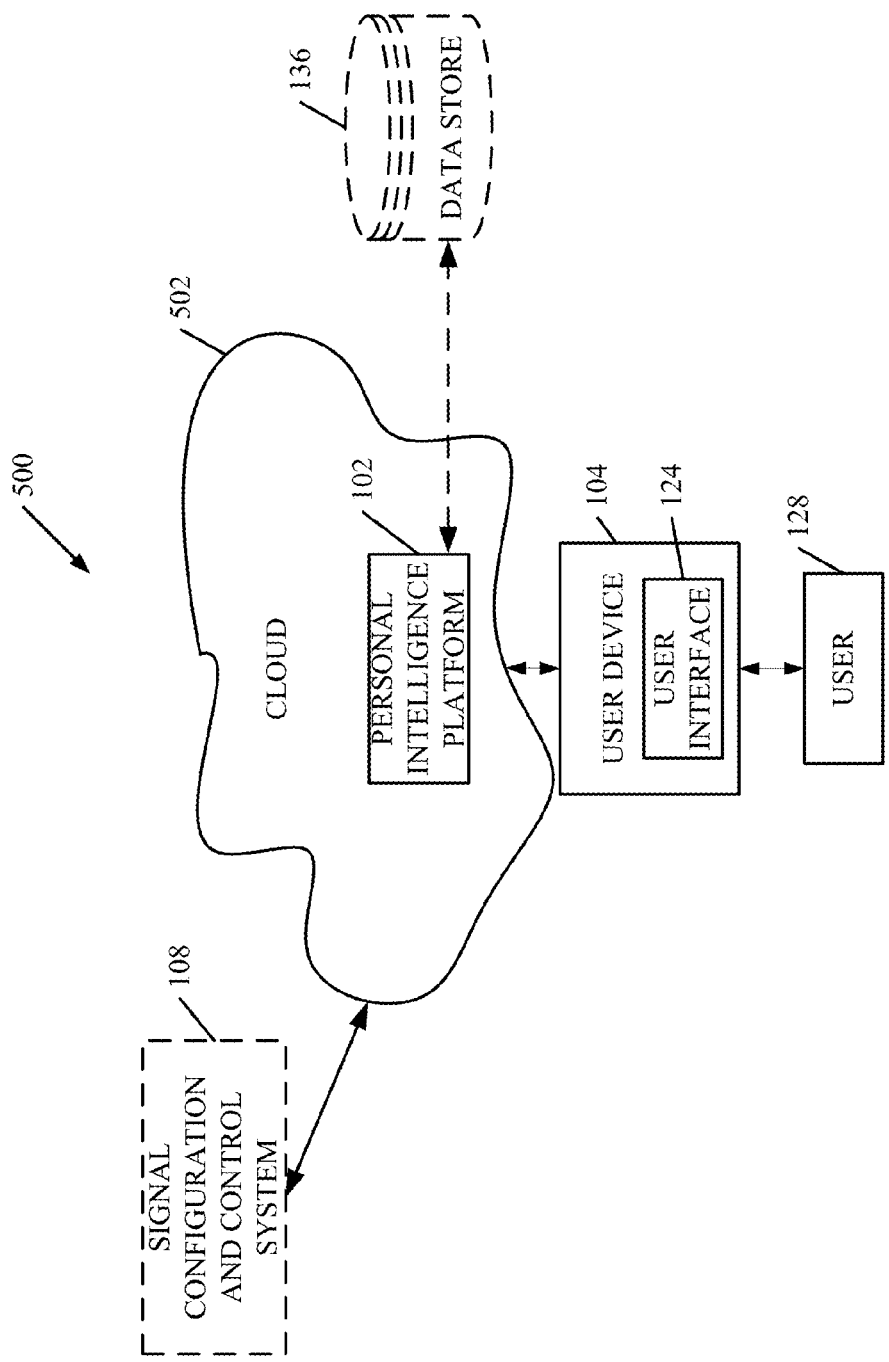
FIG. 11 is an example of a cloud computing architecture.

FIG. 11 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 11, some items are similar to those shown in FIG. 1 and they are similarly numbered. FIG. 11 specifically shows that platform 102 can be located in cloud 502 (which can be public, private, or a combination where portions are public while others are private). Therefore, user 128 uses a user device 104 to access those systems through cloud 502.

FIG. 11 also depicts another embodiment of a cloud architecture. FIG. 11 shows that it is also contemplated that some elements of architecture 100 are disposed in cloud 502 while others are not. By way of example, data store 136 can be disposed outside of cloud 502, and accessed through cloud 502. In another embodiment, system 136 can also be outside of cloud 502. Regardless of where they are located, they can be accessed directly by device 104, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 12:
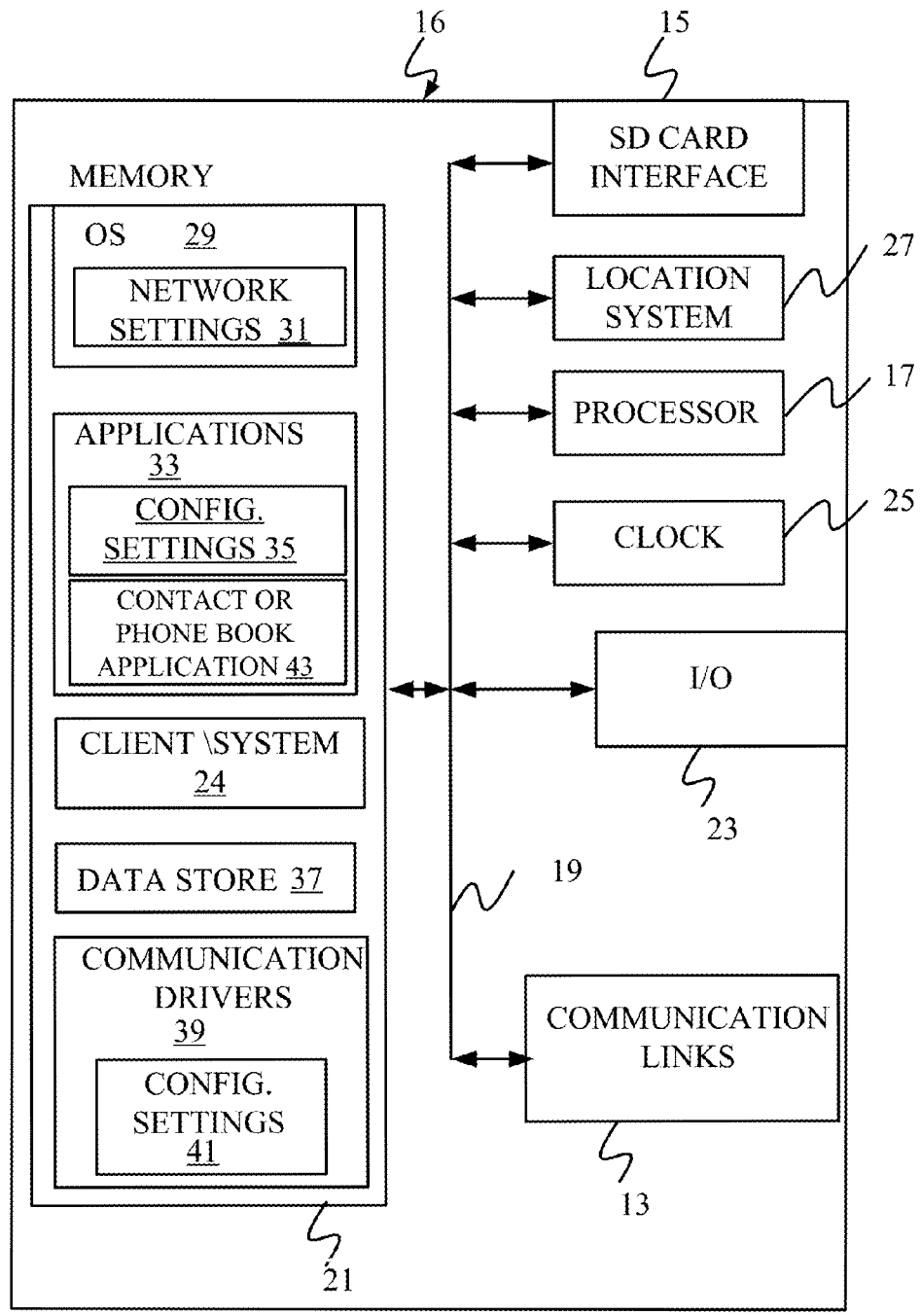
FIGS. 12-14 show examples of mobile devices.
Figure 13:
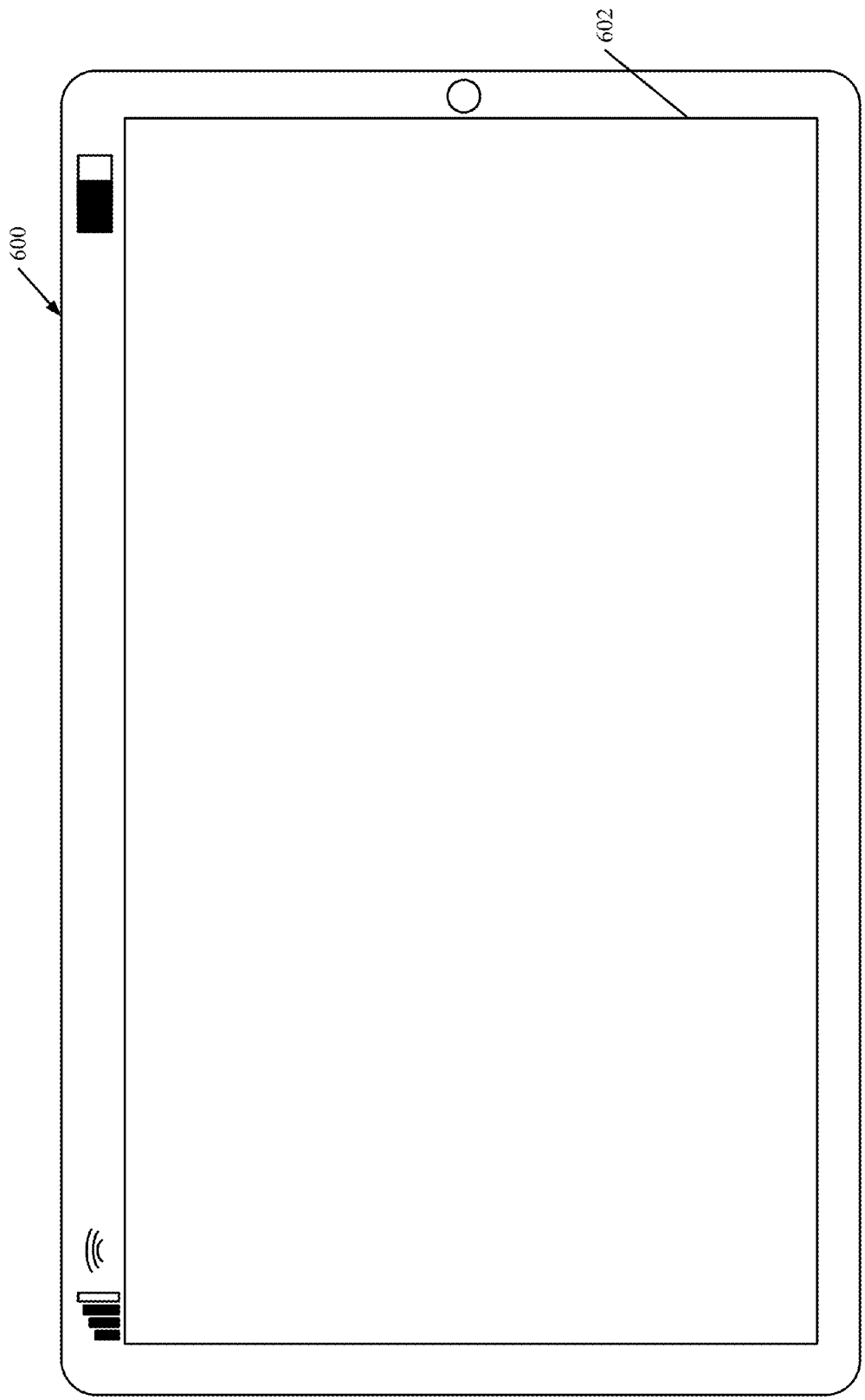

FIG. 12 is a simplified block diagram of one illustrative embodiment of a handheld or mobile computing device that can be used as a user's or client's hand held device 16, in which the present system (or parts of it) can be deployed. FIGS. 12-13 are examples of handheld or mobile devices that can be user device 104.

FIG. 12 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors 114 or 140 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, accelerometers and gravity switches and output components such as a display device, a speaker, haptic output device and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of platform 102. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 13 shows one embodiment in which device 16 is a tablet computer 600. In FIG. 13, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 that can also be used. They can include a smart phone or mobile phone that includes a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1Xrtt, and Short Message Service (SMS) signals. In some embodiments, the phone also includes a Secure Digital (SD) card slot that accepts a SD card.

The mobile device can also be a personal digital assistant (PDA) or a multimedia player or a tablet computing device, etc. (hereinafter referred to as PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

Figure 14:
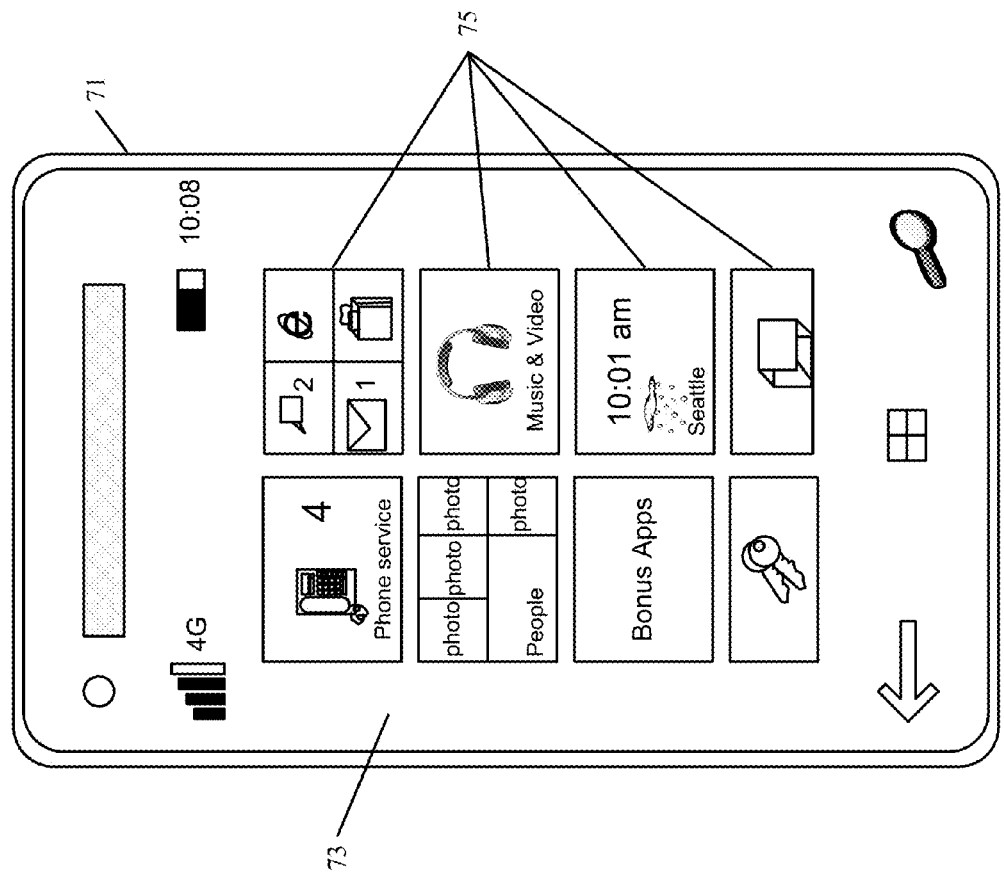

FIG. 14 shows one example of smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 15:
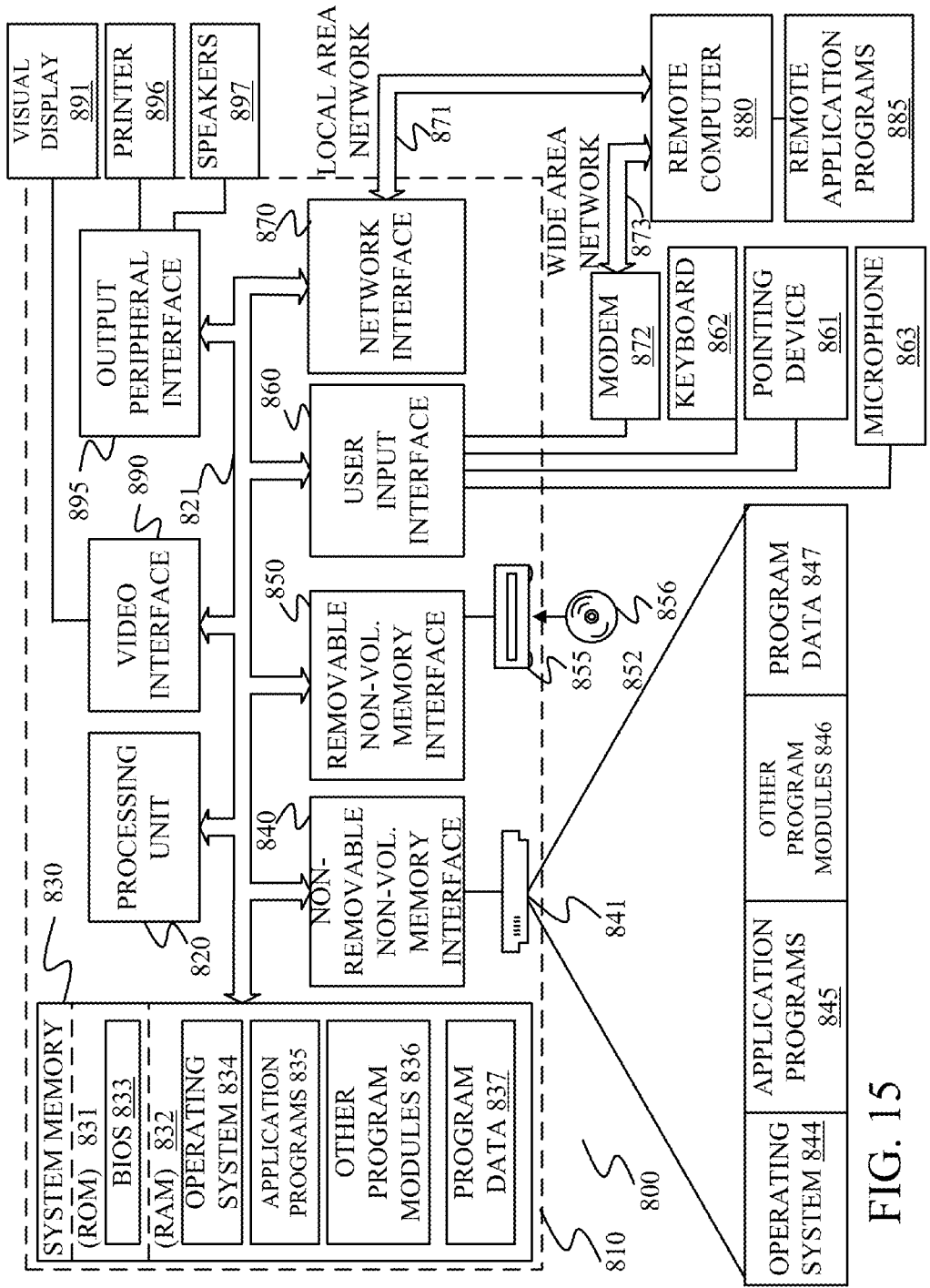
FIG. 15 is a block diagram of one example of a computing environment.

FIG. 15 is one embodiment of a computing environment in which architecture 100, or parts of it, (for example) can be deployed. With reference to FIG. 15, an exemplary system for implementing some embodiments includes a general-purpose computing device in the form of a computer 810. Components of computer 810 may include, but are not limited to, a processing unit 820 (which can comprise processor 114 or 140), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 15.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 15 illustrates operating system 834, application programs 835, other program modules 836, and program data 837.

The computer 810 may also include other removable/non-removable volatile/nonvolatile computer storage media. By way of example only, FIG. 15 illustrates a hard disk drive 841 that reads from or writes to non-removable, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 15, provide storage of computer readable instructions, data structures, program modules and other data for the computer 810. In FIG. 15, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 15 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 15 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
a search engine configured to perform searches of information sources and return search results based on search inputs by a given user;
an automated profile generator configured to access a set of information corresponding to the searches performed by the search component for the given user and generate a profile for the given user based on the set of information;
a signal broadcast control component that generates user input mechanisms that are actuated to selectively post portions of the profile to a signal service; and
a signal engagement system that receives engagement responses from the signal service and generates a user engagement interface indicative of the engagement responses.

Example 2 is the computing system of any and all previous examples and further comprising:
an activation component configured to generate an activation user interface display with an activation user input mechanism actuated to activate the signal broadcast control component to selectively post the portions of the profile to the signal service.

Example 3 is the computing system of any and all previous examples wherein the activation component is configured to generate a profile authorization user input mechanism that is actuated to authorize the automated profile generator to access the set of information and generate the profile.

Example 4 is the computing system of any and all previous examples and further comprising:
a verification component configured to access the profile and generate a verification user interface display with a verification user input mechanism that is actuated to verify information in the profile for the given user.

Example 5 is the computing system of any and all previous examples wherein the verification component is configured to generate a correction user input mechanism that is actuated to correct information in the profile to obtain a corrected profile.

Example 6 is the computing system of any and all previous examples and further comprising:
an augmentation component configured to generate an augmentation user input mechanism that is actuated to augment the profile with information from a set of private information sources for the given user.

Example 7 is the computing system of any and all previous examples wherein the augmentation component is configured to generate the augmentation user input mechanism to include a medical record input mechanism that is actuated to authorize the augmentation component to obtain personal medical records for the given user.

Example 8 is the computing system of any and all previous examples wherein the augmentation component is configured to generate the augmentation user input mechanism to include a financial record input mechanism that is actuated to authorize the augmentation component to obtain personal financial records for the given user.

Example 9 is the computing system of any and all previous examples wherein the augmentation component is configured to generate the augmentation user input mechanism to include a social network record input mechanism that is actuated to authorize the augmentation component to obtain personal social network records for the given user.

Example 10 is the computing system of any and all previous examples wherein the automated profile generator is configured to use the search engine to search for publically available information about the given user and generate the profile based on the publically available information.

Example 11 is the computing system of any and all previous examples wherein the automated profile generator is configured to divide the profile into a people section indicative of information corresponding to the given user related to people, a places section indicative of information corresponding to the given user related to places and a things section indicative of information corresponding to the given user related to things.

Example 12 is a method, comprising:

accessing a set of information corresponding to information retrieval searches performed by a given user;

generating a profile for the given user based on the set of information;

generating a post user input mechanism;

receiving actuation of the post user input mechanism identifying selected portions of the profile to post to a signal service;

posting the selected portions of the profile to the signal service;

receiving engagement responses from the signal service; and generating a user engagement interface indicative of the engagement responses.

Example 13 is the method of any and all previous examples and further comprising:

generating an augmentation user input mechanism that is actuated to augment the profile with information from a set of private information sources for the given user;

receiving user actuation of the augmentation user input mechanism to identify a selected set of the private information sources; and augmenting the profile with information from the selected set of private information sources.

Example 14 is the method of any and all previous examples and further comprising:

generating an activation user interface display with an activation user input mechanism;

receiving user actuation of the activation user input mechanism; and in response, activating the posting of the selected portions of the profile to the signal service.

Example 15 is the method of any and all previous examples and further comprising:

prior to posting, generating a verification user interface display, displaying the profile;

displaying a verification user input mechanism that is actuated to verify information in the profile for the given user;

receiving actuation of the verification user input mechanism; and in response, posting the selected portions of the profile to the signal service.

Example 16 is the method of any and all previous examples wherein generating a verification user interface display comprises:

generating a correction user input mechanism that is actuated to correct information in the displayed profile to obtain a corrected profile.

Example 17 is the method of any and all previous examples and further comprising:

generating the augmentation user input mechanism to include a medical record input mechanism that is actuated to authorize the augmentation component to obtain personal medical records for the given user, and a financial record input mechanism that is actuated to authorize the augmentation component to obtain personal financial records for the given user.

Example 18 is the method of any and all previous examples wherein generating the profile comprises dividing the profile into a people section indicative of information corresponding to the given user related to people, a places section indicative of information corresponding to the given user related to places and a things section indicative of information corresponding to the given user related to things, and wherein generating the user engagement interface comprises displaying a separate people section, places section and things section, based on which sections of the profile the engagement responses correspond to.

Example 18 is a computer readable storage medium that stores computer executable instructions which, when executed by a computer, cause the computer to perform a method, comprising:

generating a profile for the given user based on a set of information corresponding to information retrieval searches performed by a given user;

receiving actuation of a post user input mechanism identifying selected portions of the profile to post to a signal service;

posting the selected portions of the profile to the signal service; and generating a user engagement interface indicative of engagement responses received from the signal service.

Example 20 is the computer readable storage medium of any and all previous examples and further comprising:

receiving actuation of an authorization user input mechanism;

in response, obtaining personal data records for the given user; and adding the personal data records to the profile for the given user.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
   a processor; and
   memory storing instructions executable by the processor, wherein the instructions configure the computing system to:
   access a user profile;
   identify a set of different content categories from information stored in the user profile;

generate a representation of a user interface display that identifies the set of different content categories and includes a content category selection user input mechanism;
receive an indication of user actuation of the content category selection user input mechanism;
based on the indication of user actuation of the content category selection user input mechanism, select a plurality of content categories from the set of different content categories;
generate a plurality of broadcast signals based on the plurality of content categories, wherein each broadcast signal corresponds to a particular one of the content categories and includes a subset of the information stored in the user profile that is specific to the particular content category;
communicate the plurality of broadcast signals to a signal service, the signal service being configured to communicate the broadcast signals to a plurality of different, remotely-located signal engagement computing systems;
receive, from the signal service, a set of engagement responses,
wherein each engagement response corresponds to a particular one of the signal engagement computing systems and is associated with a particular one of the broadcast signals, the engagement response comprising:
location information indicative of a location associated with the engagement response; and
response information pertaining to the content category that corresponds to the particular broadcast signal;
generate a representation of an engagement response user interface display that includes a map representation and, for each engagement response, a user actuatable display element that represents the engagement response and is displayed on the map representation based on the location information; and
based on an indication of user actuation of one of the display elements, display the response information corresponding to the display element.

2. The computing system of claim 1 wherein the instructions configure the computing system to:
generate a representation of an activation user interface display with an activation user input mechanism; and
in response to an indication of user actuation of the activation user input mechanism, activate a signal broadcast control component that accesses the user profile and controls generation of the plurality of broadcast signals that are communicated to the signal service.

3. The computing system of claim 1, wherein each engagement response identifies an item of interest, and the instructions configure the computing system to:
generate the representation of the engagement response user interface display with a representation of the item of interest and an action user interface element;
receive an indication of user actuation of the action user interface element; and based on the indication of user actuation of the action user interface element, perform an action relative to the item of interest.

4. The computing system of claim 1, wherein the instructions configure the computing system to:
generate a representation of a profile authorization user input mechanism;
receive an indication of user actuation of the profile authorization user input mechanism;
based on the indication of user actuation of the profile authorization user input mechanism, authorize an automated profile generator to access the information and generate the user profile;
generate a representation of a verification user interface display with a verification user input mechanism;
receive an indication of user actuation of the verification user input mechanism; and
based on the indication of user actuation of the verification user input mechanism, verify information in the user profile.

5. The computing system of claim 4 wherein the instructions configure the computing system to:
generate a representation of a correction user input mechanism;
receive an indication of user actuation of the correction user input mechanism;
based on the indication of user actuation of the correction user input mechanism, correct information in the user profile to obtain a corrected profile;
generate a representation of an augmentation user input mechanism;
receive an indication of user actuation of the augmentation user input mechanism; and
based on the indication of user actuation of the augmentation user input mechanism, augment the user profile with information from a private information source.

6. The computing system of claim 1, wherein the user profile corresponds to a first user, and wherein the instructions configure the computing system to:
receive an indication of a second broadcast signal from the signal service, the second broadcast signal being associated with a second user;
generate a representation of a broadcast signal user interface display that displays an indication of the second broadcast signal and includes a response user input mechanism;
receive an indication of user interaction with the response user input mechanism;
based on the indication of user interaction with the response user input mechanism, generate a second engagement response to the second broadcast signal;
send the second engagement response to the signal service.

7. The computing system of claim 1, wherein the plurality of broadcast signals are generated based on a geographic location.

8. The computing system of claim 7 wherein the geographic location is based on a current location of a user associated with the user profile, and wherein the plurality of remotely-located signal engagement computing systems are selected based on the geographic location.

9. The computing system of claim 8, wherein the location information is indicative of a location associated with the particular signal engagement computing system, and wherein the instructions configure the computing system to:
generate the map representation to include the user actuatable display element at a position that represents the relative proximity of the particular signal engagement computing system to the current location of the user.

10. The computing system of claim 1, wherein the location is associated with a source that generated the engagement response.

11. The computing system of claim 1, wherein each display element indicates how well the engagement response represented by the display element matches the area of interest.

12. The computing system of claim 1, wherein the engagement response user interface display visually distinguishes each engagement response, in the set of engagement responses, based on the plurality of content categories.

13. The computing system of claim 1, wherein the instructions configure the computing system to:
   generate the representation of the engagement response user interface display with user actuatable display elements corresponding to the plurality of content categories, each display element corresponding to a particular one of the content categories and being actuatable to display any engagement responses, in the set of engagement response, that are associated with the particular content category.

14. The computing system of claim 1, wherein each engagement response is associated with the particular broadcast signal based on a determination that the engagement response was generated by the corresponding signal engagement computing system in response to the particular broadcast signal.

* * * * *